US008902227B2

(12) United States Patent
Harrison

(10) Patent No.: US 8,902,227 B2
(45) Date of Patent: Dec. 2, 2014

(54) SELECTIVE INTERACTIVE MAPPING OF REAL-WORLD OBJECTS TO CREATE INTERACTIVE VIRTUAL-WORLD OBJECTS

(75) Inventor: Phil Harrison, London (GB)

(73) Assignees: Sony Computer Entertainment America LLC, San Mateo, CA (US); Sony Computer Entertainment Europe Limited, London (GB)

( * ) Notice: Subject to any disclaimer, the term of this patent is extended or adjusted under 35 U.S.C. 154(b) by 1468 days.

(21) Appl. No.: 11/852,970

(22) Filed: Sep. 10, 2007

(65) Prior Publication Data

US 2009/0066690 A1 Mar. 12, 2009

(51) Int. Cl.
*G06T 17/00* (2006.01)
*G06T 19/00* (2011.01)

(52) U.S. Cl.
CPC ........... *G06T 19/006* (2013.01); *G06T 2215/16* (2013.01)
USPC ........................................... 345/420; 345/581

(58) Field of Classification Search
USPC ........................................... 382/107; 715/707
See application file for complete search history.

(56) References Cited

U.S. PATENT DOCUMENTS

| | | | | |
|---|---|---|---|---|
| 5,440,326 | A | 8/1995 | Quinn | 345/156 |
| 6,072,496 | A * | 6/2000 | Guenter et al. | 345/419 |
| 6,081,273 | A * | 6/2000 | Weng et al. | 345/420 |
| 6,417,836 | B1 | 7/2002 | Kumar et al. | |
| 7,227,976 | B1 * | 6/2007 | Jung et al. | 382/103 |
| 7,263,462 | B2 | 8/2007 | Funge et al. | 702/179 |
| 7,296,007 | B1 | 11/2007 | Funge et al. | 706/47 |
| 7,558,698 | B2 | 7/2009 | Funge et al. | 702/179 |
| 7,636,645 | B1 | 12/2009 | Yen et al. | 702/152 |
| 7,636,697 | B1 | 12/2009 | Dobson et al. | 706/12 |
| 7,636,701 | B2 | 12/2009 | Funge et al. | 706/47 |
| 7,797,261 | B2 * | 9/2010 | Yang | 706/45 |
| 8,083,589 | B1 * | 12/2011 | Kavars et al. | 463/36 |
| 2003/0038822 | A1 * | 2/2003 | Raskar | 345/632 |
| 2005/0233810 | A1 * | 10/2005 | Chiang | 463/42 |
| 2007/0120834 | A1 | 5/2007 | Boillot | |
| 2007/0120996 | A1 | 5/2007 | Boillot | |
| 2008/0056561 | A1 | 3/2008 | Sawachi | |
| 2008/0070684 | A1 | 3/2008 | Haigh-Hutchinson | |
| 2009/0044113 | A1 * | 2/2009 | Jones et al. | 715/707 |
| 2009/0221368 | A1 | 9/2009 | Yen et al. | 463/32 |
| 2009/0221374 | A1 | 9/2009 | Yen et al. | 463/42 |
| 2009/0288064 | A1 | 11/2009 | Yen et al. | 717/106 |
| 2010/0004896 | A1 | 1/2010 | Yen et al. | 702/153 |

* cited by examiner

*Primary Examiner* — Phi Hoang
(74) *Attorney, Agent, or Firm* — Martine Penilla Group, LLP

(57) ABSTRACT

A method for interactively defining a virtual-world space based on real-world objects in a real-world space is disclosed. In one operation, one or more real-world objects in the real-world space is captured to define the virtual-world space. In another operation, one of the real-world objects is identified, the identified object is to be characterized into a virtual-world object. In yet another operation, a user is prompted for user identification of one or more object locations to enable extraction of parameters for real-world object, and the object locations are identified relative to an identifiable reference plane in the real-world space. In another operation, the extracted parameters of the real-world object may be stored in memory. The virtual-world object can then be generated in the virtual world space from the stored extracted parameters of the real-world object.

29 Claims, 24 Drawing Sheets

SELECTIVE INTERACTIVE MAPPING OF REAL-WORLD OBJECTS TO CREATE INTERACTIVE VIRTUAL-WORLD OBJECTS

BACKGROUND

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity and computer programs. Some computer programs define virtual-worlds. A virtual-world is a simulated environment in which users may interact with each other via one or more computer processors. Users may appear on a video screen in the form of representations referred to as avatars. The degree of interaction between the avatars and the simulated environment is implemented by one or more computer applications that govern such interactions as simulated physics, exchange of information between users, and the like. The nature of interactions among users of the virtual-world is often limited by the constraints of the system implementing the virtual-world.

It is within this context that embodiments of the invention arise.

SUMMARY

Broadly speaking, the present invention fills these needs by allowing users to interactively generate and define geometric attributes of real-world objects, which can be displayed on a screen and rendered in and along with virtual-world objects. By interactively generating virtual-world objects, users can customize objects within a virtual environment based on the user's real-world environment. The generated virtual-world objects can also interact with other virtual objects within the virtual environment. The virtual-world can be traveled, visited, and interacted with by multiple users via internet enabled computers. The real-world users control avatars (e.g. virtual persons) with a variety of user input methods such as, but not limited to, controllers, motion detection, and sound detection.

In one embodiment, a method for interactively defining a virtual-world space based on real-world objects in a real-world space is disclosed. In one operation, one or more real-world objects in the real-world space is captured to define the virtual-world space. In another operation, one of the real-world objects is identified, the identified object is to be characterized into a virtual-world object. In yet another operation, a user is prompted for user identification of one or more object locations to enable extraction of parameters for real-world object, and the object locations are identified relative to an identifiable reference plane in the real-world space. In another operation, the extracted parameters of the real-world object may be stored in memory. The virtual-world object can then be generated in the virtual world space from the stored extracted parameters of the real-world object.

In another embodiment, a system for creating virtual objects by interactively capturing parameters of real-world objects is disclosed. The system includes a computer system with a processor, an input/output interface, and memory. The memory of the computer system can be configured to store instructions for execution by the processor. The system can also include a capture system coupled to the input/output interface of the computer system. The capture system can be configured to capture images of one or more real-world objects of a real space. Also include in the system is a user interface for the computer system. The user interface may be used to setup the capture system to identify a particular object. The system further includes a screen coupled to the input/output interface of the computer system and the screen can be configured to display the user interface and images from the capture system. The system also includes logic stored in the memory and executed by the processor. The logic may be configured to process input to the user interface, where the input can include identification signals to selectively identify locations of the real-world object relative to an identifiable reference plane. The identified locations can then be used to define parameters that define geometric aspects of a generated virtual-world object.

In yet another embodiment, a method for interactively defining a virtual-world space based on real-world objects in a real-world space is disclosed. The method captures one or more real-world objects in the real-world space and the captured real-world object can be used to define the virtual-world space. In another operation, the method identifies one of the real-world objects to be characterized into a virtual-world object. In yet another operation, the method prompts a user to identify of one or more transition boundaries, where the transition boundaries are identified relative to an identifiable reference plane in the real-world space. In still another operation, the method determines geometric aspects of the real-world object from the transition boundaries. In another operation, the method stores the geometric aspects of the real-world object in memory and generates a virtual-world object in the virtual-world space from the stored geometric aspects of the real-world object.

In still another embodiment, a method for interactively defining a virtual-world space based on real-world objects in a real-world space is disclosed. The method captures one or more real-world objects in the real-world space to define the virtual-world space. In another operation, the method identifies one of the real-world objects to be characterized into a virtual-world object. In another operation, the method prompts a user to identify one or more surface locations of the identified real-world object. The surface locations of the identified real-world object can be used to extract geometric aspects of the real-world object, and to also identify the surface locations relative to an identifiable reference plane in the real-world space. In another operation, the method stores the extracted relative geometric aspects of the real-world object in memory and generates a virtual-world object in the virtual-world space using the stored geometric aspects of the real-world object.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 6A-1 illustrates a real-world scene including the camera in accordance with one embodiment of the present invention.

FIG. 6A-2 represents an on screen image of the real-world scene from FIG. 6A-1 taken by the camera in accordance with one embodiment of the present invention.

FIG. 6B-1 through FIG. 6G-1 shows the real-world scene that includes the user interactively identifying various geometric attributes of the real-world seat in response to various on-screen prompts based on an object template, in accordance with one embodiment of the present invention.

FIG. 6B-2 through FIG. 6G-2 shows a screen displaying an image of the user identifying various surfaces, points or transitional surfaces of the real-world seat in order to define and generate a virtual-world seat, in accordance with embodiments of the present invention.

FIG. 8A-1 through FIG. 8D-1 illustrate a real-world scene where a user identifies a real-world surface on the real-world table, in accordance with one embodiment of the present invention.

FIG. 8A-2 through FIG. 8D-2 illustrate an on-screen display that is prompting a user to identify a real-world surface that corresponds to surface on the object template, in accordance with one embodiment of the present invention.

FIG. 9A-1 is a real-world scene of a user sitting on the real-world seat interactively manipulating an avatar representing user A in a virtual-world, the virtual-world displayed to user A on the screen, in accordance with one embodiment of the present invention.

FIG. 9A-2 illustrates the virtual-world displayed to user A on the screen in FIG. 9A-1, in accordance with one embodiment of the present invention.

FIG. 9A-3 shows the virtual-world dog interacting with the virtual-world seat, in accordance with one embodiment of the present invention.

FIGS. 10A-1 and 10A-2 illustrate both the real-world scene and the virtual-world scene as displayed on the screen of user A while mapping geometric attributes of the real-world window in accordance with one embodiment of the present invention.

FIGS. 11A-1 and 11A-2 are additional illustrations of both the real-world scene and the virtual-world scene as displayed on the screen of user A while mapping geometric attributes of the real-world lamp, in accordance with one embodiment of the present invention.

DETAILED DESCRIPTION

Figure 1A:
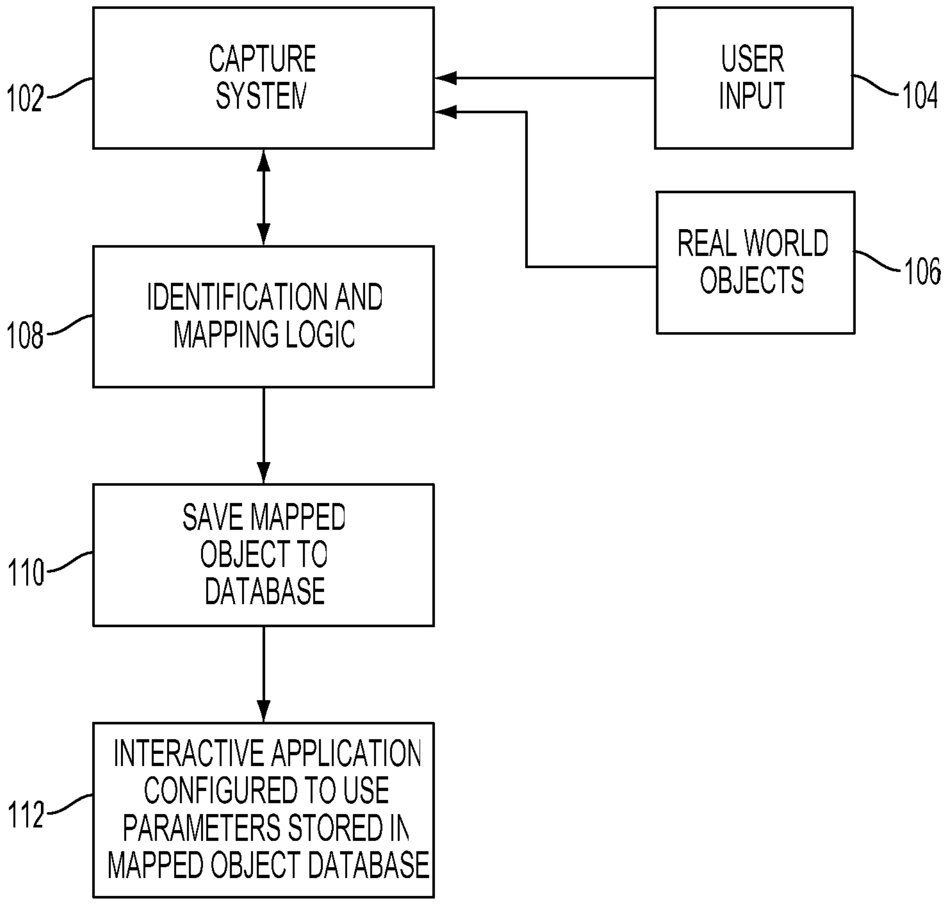
FIG. 1A is an exemplary block diagram illustrating a computer system that can be used to interactively create a virtual-world object based on a real-world object, in accordance with one embodiment of the present invention.

An invention is disclosed for computer implemented methods and systems that enable capture of geometric feature attributes of real-world objects. The captured geometric attributes are analyzed and mapped to generate a virtual-word world object. The generated virtual-world object can then be incorporated into a computer game environment, where computer generated objects, characters, environments and game functionality can co-exist to deliver an interactive experience.

The interactive experience is thus enriched, as users are allowed to capture many types objects, parameters of objects, environments and known geometric shapes, to thus inject them into a computer generated virtual space or computer executed interactive gaming space. In aspects of the present invention, some embodiments allow captured objects to be placed into specific game sequences, or generically in virtual environments that can be visited or traversed in response to user interactive control, action or interaction.

Additionally, the captured objects may be associated and mapped to known objects, such that users are able to select objects to capture, and the capturing processing walks the user through commands to systematically identify aspects of the object until the computing system believes that the object has been sufficiently identified by the user so as to identify the type of object, geometries of the object (e.g., edges, surfaces, textures, sizes, relative spacing features, and other identifiable characteristics). Accordingly, the capturing sequences, methods and systems should be broadly understood to enable the capture of any particular real-world object, discern its characteristics, identify relative sizes, and enable integration of the captured object or objects into scenes of a virtual space, gaming sequences, interactive programs, or displays of animation.

As used herein, a real-world object should include any physical or material thing that can be touched, held, moved, captured in an image, captured in a video, compared to other things to discern its size or relative size, or identified based on height, width, length, or depth, and the like. A virtual-world object shall be broadly construed to include a computer generated image or images that can be displayed on a screen. The screen can represent the virtual-world object as a two or three dimensional thing and can be animated to move, be placed, be interacted with, or be modified based on user interactivity. The interactivity can include commands provided by the user, such as by way of a computing interface. The interface can be graphical, key-board assisted, touch screen assisted, gaming controller directed, motion triggered, audibly triggered, acoustically triggered, inertial triggered, and combinations thereof. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

FIG. 1A is an exemplary block diagram illustrating a computer system 100 that can be used to interactively create a virtual-world object based on a real-world object, in accordance with one embodiment of the present invention. The computer system 100 can include a capture system 102 that has hardware and software capable of capturing audio input, video input, along with user input via dedicated input devices. For example, the capture system 102 can include an array of microphones for capturing audio input along with a video camera to capture video input. In other embodiments, the video camera can be a depth camera configured to determine relative depth of objects. The microphones and video camera of the capture system can be used to capture user input 104 and images of real-world objects 106. The capture system can also be used to accept user input that can be used to create a virtual-world object based on images, sounds and dedicated user input from a user interacting with a selected real-world object.

Images, sounds, and user input from the capture system 102 can be processed by identification and mapping logic 108. The identification and mapping logic 108 can be used to process and identify particular user input 104 captured by the capture system 108. In some embodiments, the user input 104 can include combinations of images and sounds such as a user snapping his fingers, moving his hand, shaking his wrist, wagging his finger, tapping on an object, or the like. In other embodiments, the user can provide input to the computer system 100 through a dedicated input device such as a console controller. The console controller can be configured to accept a variety of user input include buttons, triggers, and joysticks. In other embodiments, the console controller can be configured to detect translational and rotational movement, or combinations thereof, of the console controller in three-axis. In additional embodiments, the video camera of the capture system can be used to detect infrared light emissions from an array of light emitting diodes associated with the console controller. Using a variety of user input 104 associated with object locations on the real-world object, the identification and mapping logic can identify surfaces, edges, and points of real-world object to the computer system 100.

Additionally, the identification and mapping logic 108 can be associated with a database of object templates. The object templates can define generic surfaces, edges or points that can be used to define a real-world object. Using the object templates, the identification and mapping logic 108 can prompt a user to define particular points, edges, surfaces and other transition boundaries of a real-world object. For example, using an object template for a chair, the identification and mapping logic can prompt a user to identify a right and a left side of the chair. Similarly, the object template can prompt the user to identify a height of the seating surface and overall height of the chair. In another embodiment, instead of defining surfaces or sides, the object template can request a user to identify points of the seating surface such as the front-left, front-right, back-left, and back-right corners of the seating surface. Note that the particular example of the chair is intended the be exemplary and should not be construed as limiting as the object templates can encompass an endless variety of real-world objects that can be defined via the capture system 102 and the identification and mapping logic 108.

From the defined transition boundaries, the identification and mapping logic can generate a virtual-world object with geometric attributes based on the real-world object. The identification and mapping logic can include software and hardware for comparing and analyzing the defined surfaces, edges, and points to the object template in order to generate the virtual-world object. In the previously discussed chair example, the identification and mapping logic can compare the defined front-left, front-right, back-left and back-right corners of a seating surface to an object template and determine the relative position of the seating surface.

Virtual-world objects generated from the identification and mapping logic 108 can be saved in memory 110. In some embodiments, the memory 110 can be a database used to store a plurality of virtual-world objects defined by geometric attributes of real-world objects. Additionally, the computer system 100 can include additional memory and storage to execute interactive application 112 that are configured to use the geometric attributes of stored virtual-world objects. In some embodiments, the interactive applications include other virtual objects that are configured to interact with the generated virtual objects.

Figure 1B:
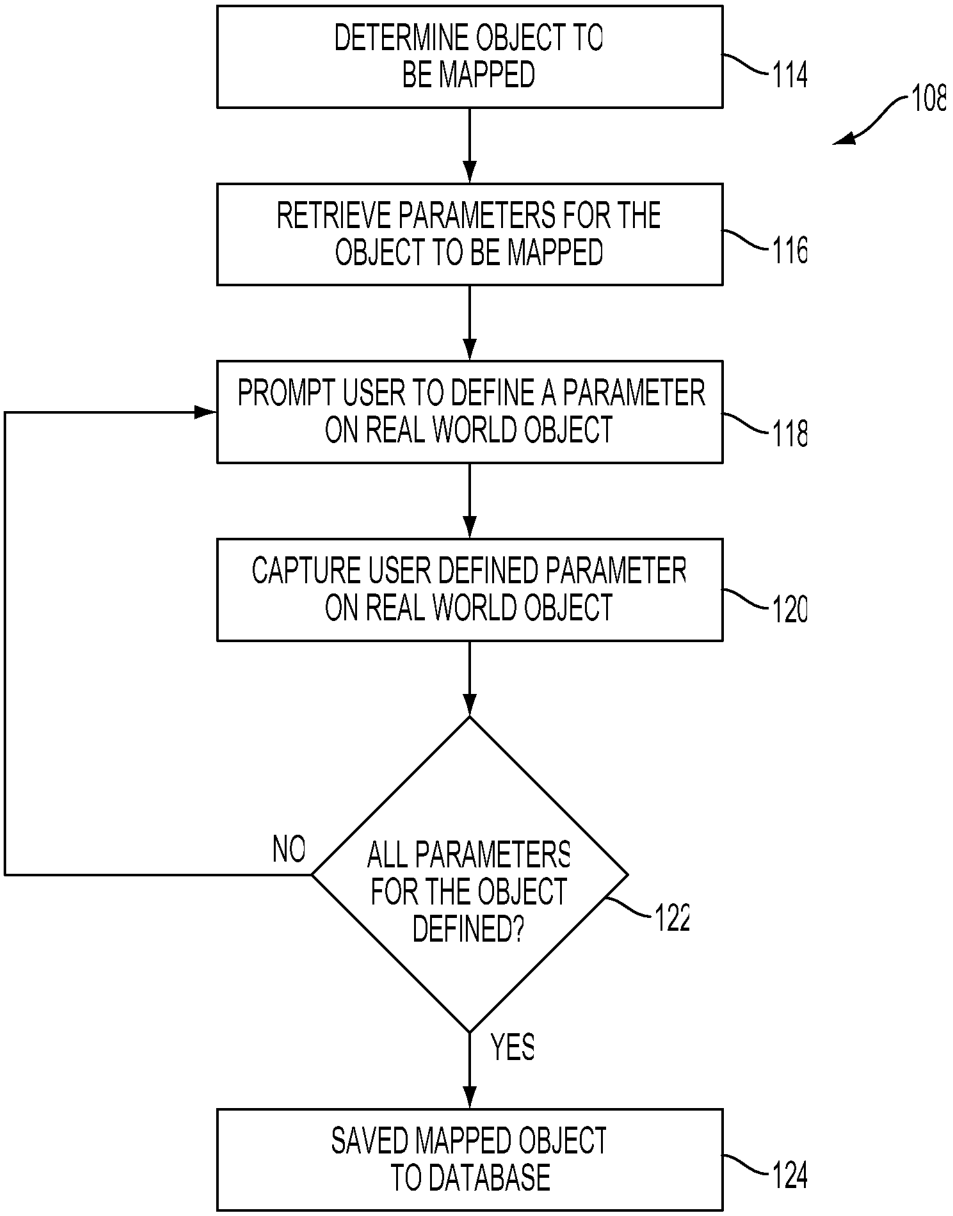
FIG. 1B is a flowchart illustrating operations to map object locations of a real-world object to create a virtual-world object in accordance with one embodiment of the present invention.

FIG. 1B is a flowchart illustrating operations to map object locations of a real-world object to create a virtual-world object in accordance with one embodiment of the present invention. In accordance with the embodiment of the computer system 100 of FIG. 1A, the operations performed in FIG. 1B would be performed using the capture system 102, user input 104, real-world objects 106 and the identification and mapping logic 108. In operation 114 a user selects a type of real-world object that is going to be mapped by geometric attributes. The selection can be performed from user input to the capture system. Operation 116 retrieves the geometric attributes that can be used by the identification and mapping logic to generate a virtual-world object based on the selected real-world object.

Operation 118 prompts the user to define one of the retrieved geometric attributes on the real-world object via user input through the capture system. Operation 120 captures the user defining the geometric attribute that was prompted in operation 118. In operation 122, it is determined if all the geometric attributes of the selected real-world object have been defined. If additional geometric attributes are needed, the procedure returns to operation 118. If enough geometric attributes have been defined so the identification and mapping logic can generate a virtual-world object, operation 124 saves the geometric attributes for the mapped object to the memory 110.

Figure 1C:
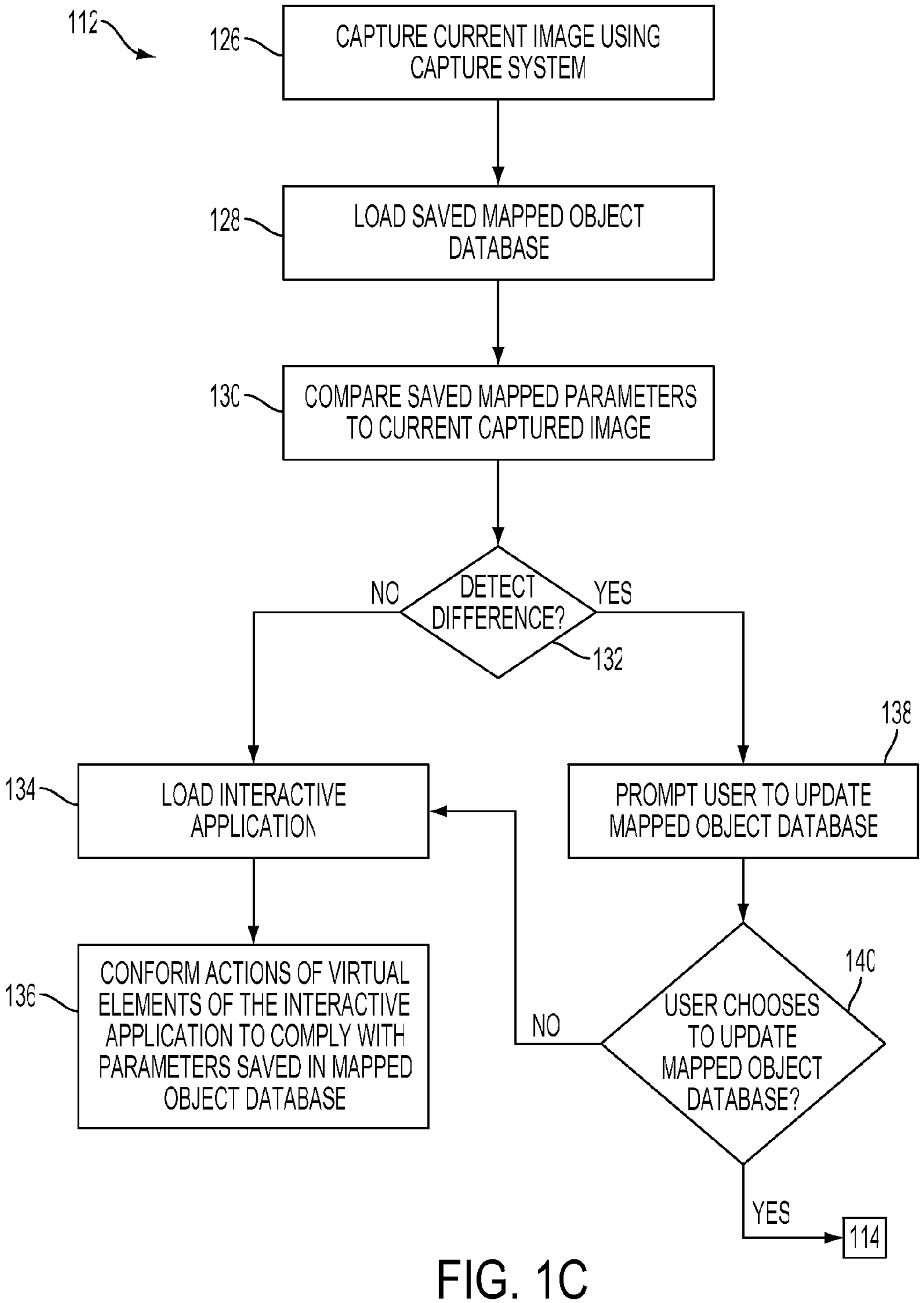
FIG. 1C is a flow chart illustrating operations of an interactive application in accordance with one embodiment of the present invention.

FIG. 1C is a flow chart illustrating operations of an interactive application 112 in accordance with one embodiment of the present invention. Operation 126 captures an image of a scene in front of the capture system. Operation 128 is used to load virtual-world objects stored in memory. Operation 120 is used to compare the virtual-world objects loaded from memory to the current image of the scene in front of the capture system. Operation 132 determines if there is a difference between the loaded virtual-world objects and the current scene in front of the capture system. If differences are detected in operation 132, operation 138 queries the user if they would like to update the virtual object database with new virtual objects based on the real-world objects in the current scene. If the user chooses to add new virtual objects, the procedure continues with operation 114 from FIG. 1B. If the user chooses not to add new virtual objects or if there are no difference detected in operation 132, operation 134 loads the interactive application. Operation 136 conforms actions of additional virtual objects of the interactive application to comply with the geometric attributes of the virtual objects loaded from memory.

Figure 2A:
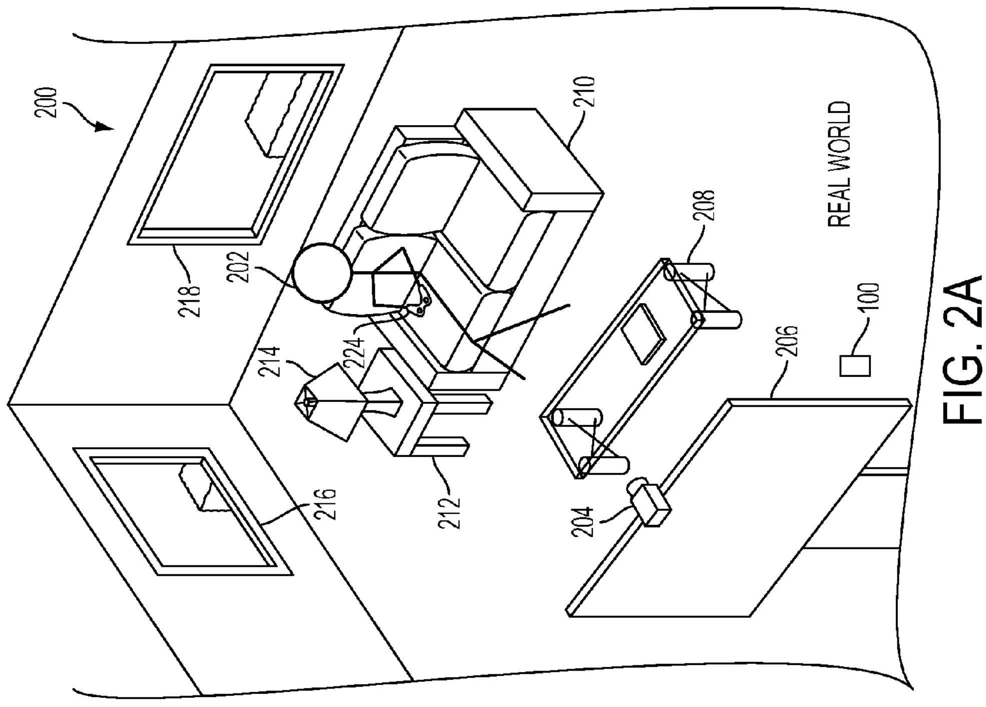
FIG. 2A is an overview of a real-world scene where a computer system is in use in accordance with one embodiment of the present invention.

FIG. 2A is an overview of a real-world scene 200 where a computer system 100 is used in accordance with one embodiment of the present invention. In this embodiment the capture system of computer system 100 includes video camera 204. Video camera 204 can be configured to take individual still images and/or continuous streaming video. The computer system 100 is configured to output video to screen 206 and audio to speakers that are not shown. In some embodiments, the video output of computer system 100 can include images captured by video camera 204. In other embodiments, the video output of the computer system 100 includes only images rendered by the computer system 100. In yet other embodiments, a combination of images captured by video camera 204 and images rendered by the computer system 100 can be output from the computer system 100.

Also shown in the real-world scene 200 is user A 202 manipulating a controller 224. The controller 224 can take on many forms, and is not limited to a standard game controller requiring two hand manipulation. Other types of controllers can include single-hand controlling object, or objects that are identified for interactivity. Consequently, the controller 224 is only shown as one example. User A 202 sits on real-world seat 210 behind real-world coffee table 208. Also included in the real-world scene 200 is real-world side table 212, real-world lamp 214, real-world window 216, and real-world window 218. Additionally, the controller 224 can be used to provide input to the computer system 100.

Figure 2B:
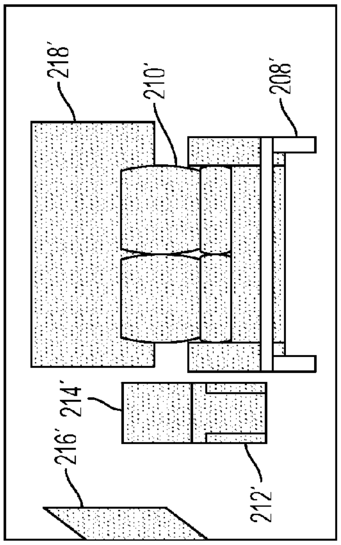
FIG. 2B illustrates defined virtual-world objects that were generated based on the real-world scene from FIG. 2A, as seen by the computer system in accordance with one embodiment of the present invention.

FIG. 2B illustrates defined virtual-world objects that were generated based on the real-world scene from FIG. 2A, as seen by the computer system 100 in accordance with one embodiment of the present invention. Note that the view illustrated in FIG. 2B is intended to illustrate the geometric attributes of defined virtual-world objects as seen by the computer system 100. In FIG. 2B, sufficient geometric attributes of real-world seat 210, have been defined in order to allow the identification and mapping logic to generate a virtual-world seat 210'. Similarly, virtual-world window 218', virtual-world lamp 214' virtual-world side table 212', virtual-world coffee table 208', and virtual-world window 216' have been defined and generated. Geometric attributes have been defined in order to help generate the respective virtual-world objects, and in some embodiments, the geometric attributes allow interaction between the generated virtual objects and additional virtual-world objects in a virtual-world scene.

Figure 2C:
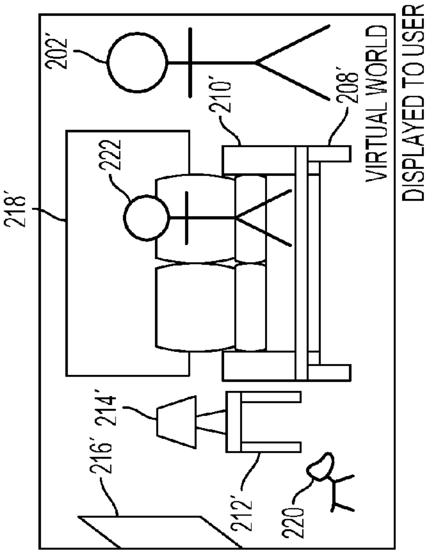
FIG. 2C illustrates a virtual-world scene as it would be displayed on a screen, in accordance with one embodiment of the present invention.

FIG. 2C illustrates a virtual-world scene as it would be displayed on a screen, in accordance with one embodiment of the present invention. In this embodiment, the virtual-world scenes is based on the real-world scene from FIG. 2A. Included in the virtual-world scene is a virtual-world user A 202' (e.g. an avatar representing real-world user A 202). Note that in FIG. 2A, user A 202 is sitting on the real-world seat 210 manipulating controller 224. As illustrated in FIG. 2C, the manipulation of the controller 224 in FIG. 2A can control the movement of an avatar represented by virtual-world user A 202' in the virtual-world scene. Thus, while user A 202 of FIG. 2A is seated, the virtual-world user A 202' can be standing.

Also shown in the virtual-world scene is an avatar for virtual-world user B 222. In some embodiments, virtual-world user B 222 can be another user of computer system 100. In other embodiments, the computer system 100 of FIG. 2A can be connected to similar systems via the internet allowing a real-world user B to control the virtual user B 222 in the virtual-world scene of FIG. 2C. In yet other embodiments, virtual-world user B 222 can be generated by the computer system to provide interaction for real-world user 202 via virtual-world user 202'. Similarly, the computer system can generate a virtual dog 202.

Included in the virtual-world scene are the generated virtual-world objects of FIG. 2B. Thus, as the geometric attributes of the generated virtual objects have been defined, virtual-world user A 202', virtual-world user B 222 and virtual-world dog 220 can interact with the virtual-world objects. As used herein, interaction between virtual-world objects can include occlusion of one virtual object by another virtual object, obstructing motion of virtual objects, deforming one virtual object based on an intersection to another virtual object and enabling one virtual object to rest upon another virtual object. Thus, as will be discussed in further detail below, on the screen, the virtual-world dog 220 could walk "behind" the virtual-world coffee table 208' and jump "onto" the virtual-world seat 210'.

In some embodiments, the appearance of virtual-world seat 210' on the screen 206 can be identical to the appearance of the real-world seat 210. In other embodiments, the appearance of the virtual-world seat 210' on the screen 206 can be entirely different from the appearance of real-world seat 210. In such embodiments, the geometric attributes of the real-world seat 210 can be used to create a framework for the virtual-world seat 210'. The different appearance of the virtual-seat 210' can be skinned over the geometric attribute define framework of the real-world seat 210.

Figures 2, 3A:
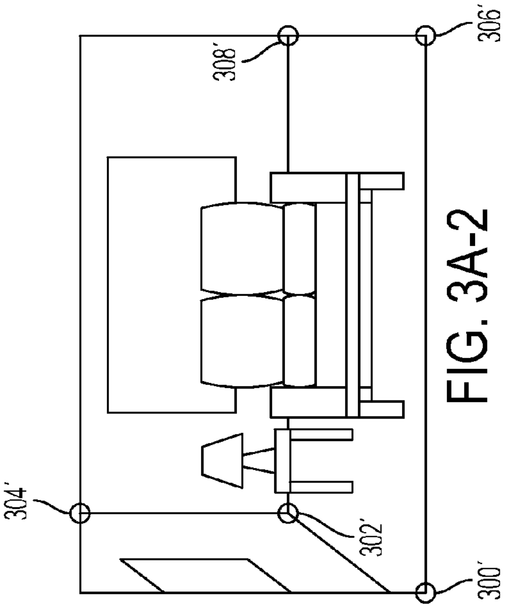
FIGS. 3A-1 and 3A-2 are a real-world scene and a camera image displayed on a screen, respectively, each illustrating the input of reference points in a real-world space to assist in the mapping of geometric attributes of real-world objects, in accordance with one embodiment of the present invention.
Figures 1, 3A:
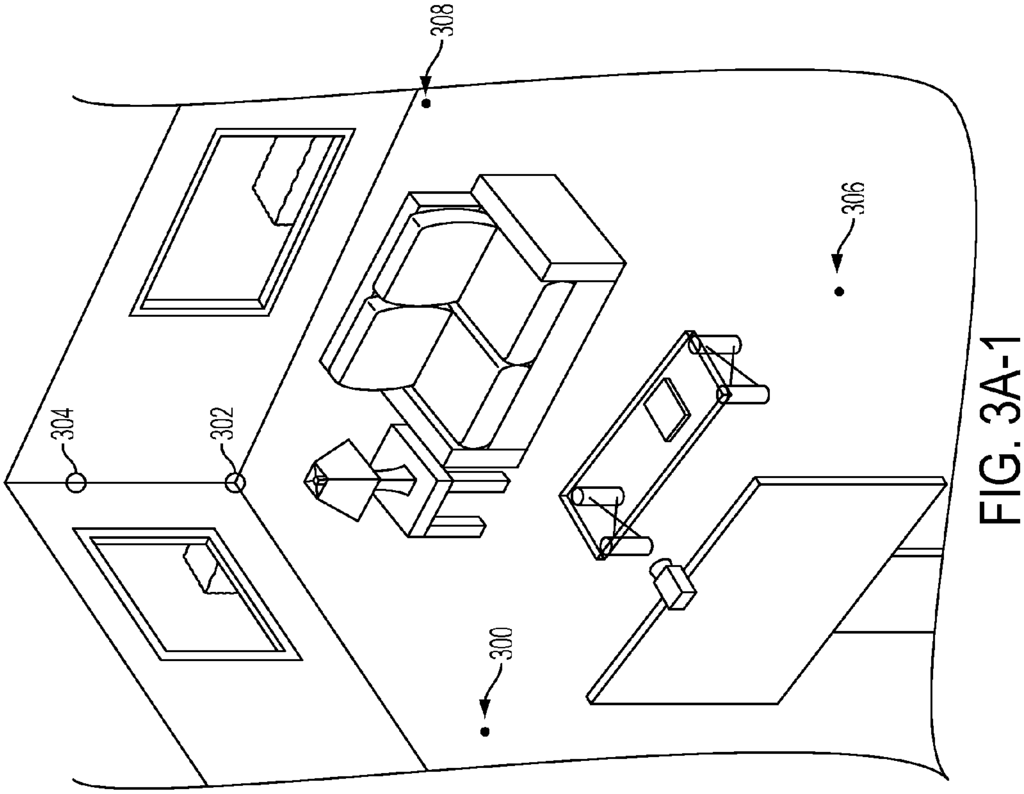

FIGS. 3A-1 and 3A-2 are a real-world scene and a camera image displayed on a screen, respectively, each illustrating the input of reference points in a real-world space to assist in the mapping of geometric attributes of real-world objects, in accordance with one embodiment of the present invention. Reference points can be used by the computer system to identify a reference plane in the real-world space. Using the reference plane, the identification and mapping logic can determine the relative location of generated virtual-world objects relative to the reference plane. In one embodiment, the computer system can prompt a user to identify reference points based on an image of the real-world scene displayed on the screen.

For example, the computer system may request that a user identify enough reference points so as to define a floor in the real-world scene. Thus, as shown in FIGS. 3A-1 and 3A-2, a user may be prompted to identify the most forward left point 300' on the screen in the real-world scene. Accordingly, a user in the real-world of FIG. 3A-1 could walk over to point 300 and provide the requisite user input to indicate the location of point 300 to the computer system. Similarly, the user could be prompted to identify additional points of the reference plane such as point 302/302', point 308/308' and point 306/306'. In other embodiments, a user may be prompted to define a vertical point such as points 304/304'. In an alternate embodiment, reference points defining the floor of the real-world scene can be determined by tracking the feet of a user as the user walks around the real-world scene. Recognition and tracking the feet of the user could be performed by the identification and mapping logic.

Figure 4A:
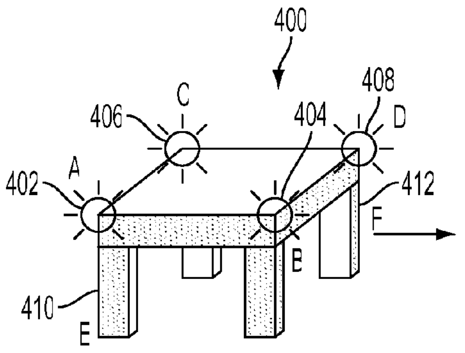
FIG. 4A illustrates the use of transition boundaries and surfaces to define locations on a real-world table, in accordance with one embodiment of the present invention.

FIG. 4A illustrates the use of transition boundaries and surfaces to define locations on a real-world table 400, in accordance with one embodiment of the present invention. In this embodiment, a transition boundary is found at corner A 402. Similarly, additional transition boundaries are defined at corner B 404, corner C 406 and corner D 408. As previously discussed, a user can be prompted to identify the respective transition boundaries using a variety of user input methods. Different forms of user input can be used to identify surfaces on the real-world table 400 such as front surface 410 or right surface 412. For example, in one embodiment, aligning a console controller in a particular orientation and pressing a particular button can identify transition surfaces such as points. In other embodiments, tapping a hand across the real-world surface or moving a controller across the surface with a particular button depressed can identify surfaces. As there are additional input methods the particular embodiments should be considered exemplary and should not be considered limiting.

Figure 4B:
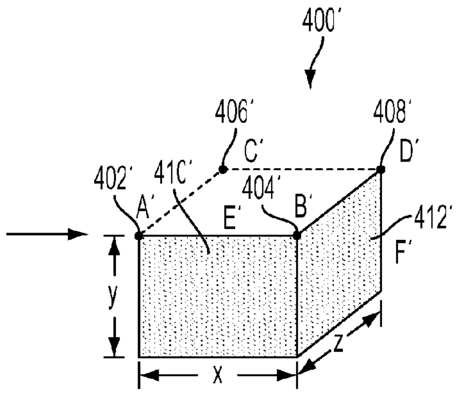
FIG. 4B illustrates the computer system view of the transition boundaries defined from the real-world table from FIG. 4B, in accordance with one embodiment of the present invention.

FIG. 4B illustrates the computer system view of the transition boundaries defined from the real-world table 400 from FIG. 4B, in accordance with one embodiment of the present invention. The transition boundaries of the real-world table 400 can be used to define a virtual-world table 400'. The virtual-world table 400' has a surface created from user input that defines the relative position of corners A-D of the real-world table 400 in FIG. 4A. The resulting virtual-world corners, virtual corner A 402', virtual corner B 404', virtual corner C 406' and virtual corner D 408' create a surface at a height y above the reference plane, or floor. Similarly, by defining front surface 410 and right surface 412 on the real-world table 400, virtual-world table front surface 410' and virtual-world table right surface 412' are respectively defined.

Based on the virtual-world corner and virtual-world surfaces, the geometric attributes shown in FIG. 4B for virtual-world table 400' are defined. As defined by the geometric attributes shown in FIG. 4B, the virtual-world table 400 has solid sides so other virtual elements would be prevented from going "under" the virtual-world table 400'. In other embodiments, additional parameters may be defined to create a virtual-world table with more refined details. For example, whereas the geometric attributes of the virtual-world table 400' appear as a solid block, a user could define additional parameters such as the thickness of the table surface. In other embodiments, various object templates can include a variety of different table styles that including parameters to better define table legs. With greater refinement of the geometric attributes, the virtual-world table 400' could be modeled to appear identical to the real-world table 400 thus allow other virtual elements to interact with a space under the virtual-world table 400'.

Figure 5A:
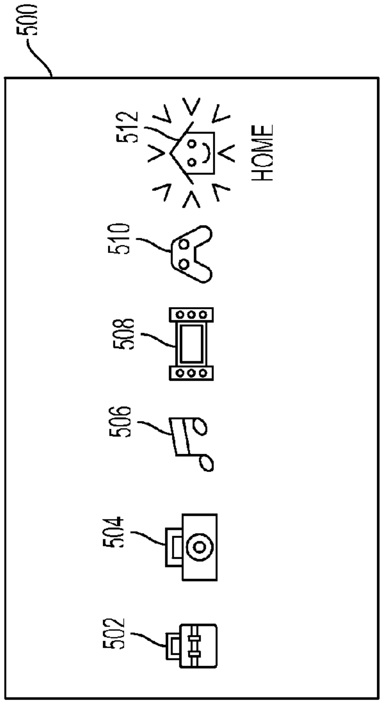
FIG. 5A illustrates an exemplary user interface of a computer system that enables a user to interactively create a virtual-world object based on a real-world object, in accordance with one embodiment of the present invention.

FIG. 5A illustrates an exemplary user interface of a computer system that enables a user to interactively create a virtual-world object based on a real-world object, in accordance with one embodiment of the present invention. Screen 500 displays multiple graphical icons that represent various capabilities of the computer system. Selecting toolbox icon 502 can display various submenu icons that allow a user to customize and configure different aspects of the computer system. Camera icon 504 can be selected to access submenus for display and editing digital photographs. In this embodiment, the computer system also includes the functionality of playing music, represented by music icon 506, playing video, as shown with movie icon 508, playing interactive games by accessing game icon 510, or accessing a virtual-world home using home icon 512. The particular icons shown in FIG. 5A are exemplary and should not be considered limiting as the user interface can be individually customized to contain fewer or additional icons.

The computer system can be connected to the internet enabling access to a social networking environment where individual users of like computer systems can be represented in a virtual-world by avatars. Users can configure their avatars and can similarly configure a virtual-world home for their avatar. The user can configure their virtual home just as users can configure avatars to be realistic representations or fanciful representations of themselves.

Figure 5B:
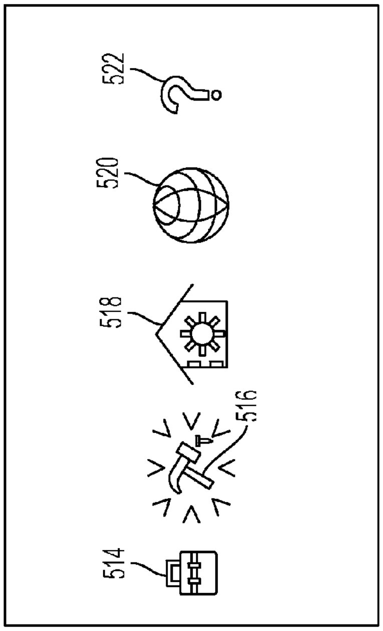
FIG. 5B illustrates an exemplary virtual home submenu after selecting the home icon of FIG. 5A, in accordance with one embodiment of the present invention.

FIG. 5B illustrates an exemplary virtual home submenu after selecting the home icon 512 of FIG. 5A, in accordance with one embodiment of the present invention. The virtual home submenu includes a toolbox icon 514 to configure general aspects of the virtual home. The hammer icon 516 can be selected to allow a user to build and configure various aspects of their virtual home or configure and customize their avatar. A bank icon 518 is included to allow a user to acquire, spend, and manage virtual currency in the virtual-world. In one embodiment, Globe icon 510 can be used to display a graphical illustration of particular aspects of the virtual-world community. Additionally, help icon 522 can be selected to access online help.

Figure 5C:
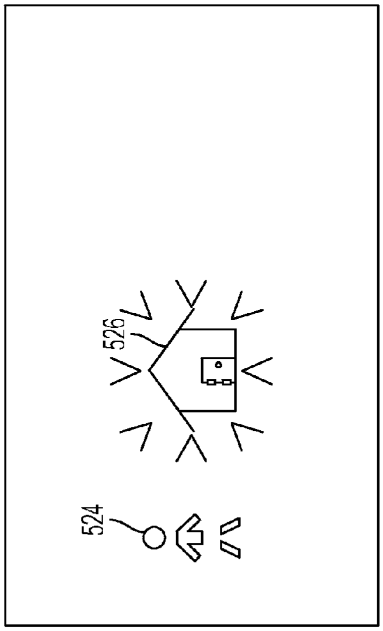
FIG. 5C illustrates an exemplary submenu after selecting the hammer icon of FIG. 5B, in accordance with one embodiment of the present invention.

FIG. 5C illustrates an exemplary submenu after selecting the hammer icon 516 of FIG. 5B, in accordance with one embodiment of the present invention. Selecting avatar icon 524 allows a user to configure and customize various aspects of their avatar. Selecting house icon 526 allows a user to build and configure various aspects of their virtual-world home.

Figure 5D:
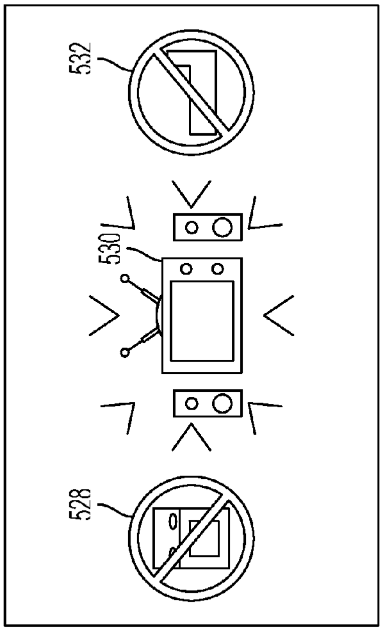
FIG. 5D illustrates an exemplary submenu after selecting the house icon of FIG. 5C, in accordance with one embodiment of the present invention.

FIG. 5D illustrates an exemplary submenu after selecting the house icon 526 of FIG. 5C, in accordance with one embodiment of the present invention. Stove icon 528 can be used to configure a virtual-world kitchen whereas bed icon 532 can be used to configure a virtual-world bedroom. Similarly, media room icon 530 can be used to configure and customize a virtual-world media room. Alternatively, instead of a virtual-world media room, a user could configure a virtual-world living room or great room for entertaining virtual-world guests.

Figure 5E:
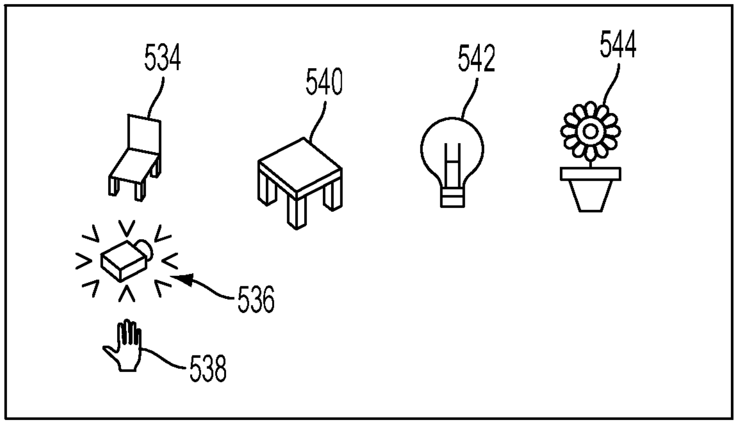
FIG. 5E shows a variety of household objects such as furniture and other fixed background objects that can be configured and customized for placement in a virtual-world media room or virtual-world living room, in accordance with one embodiment of the present invention.

FIG. 5E shows a variety of household objects such as furniture and other fixed background objects that can be configured and customized for placement in a virtual-world media room or virtual-world living room, in accordance with one embodiment of the present invention. A seating icon 534 allows users to configure and customize a variety of seating options such as chairs, sofas, benches, and couches. Selecting table icon 540 enables a user to customize virtual-world tables that can be placed in their virtual-world living room. Light icon 542 can be used to configure virtual-world lighting fixtures and plant icon 544 can be used to customize virtual-world plants. For simplicity, a limited number of household objects are shown in FIG. 5E and the illustrated items should not be considered limiting. Other household items or fixed background objects such as, but not limited to, windows, area rugs, desks, portraits, painting, sculptures, audio/visual equipment, communication devices, and computers can be selected by a user for customization and configuration.

Figure 5F:
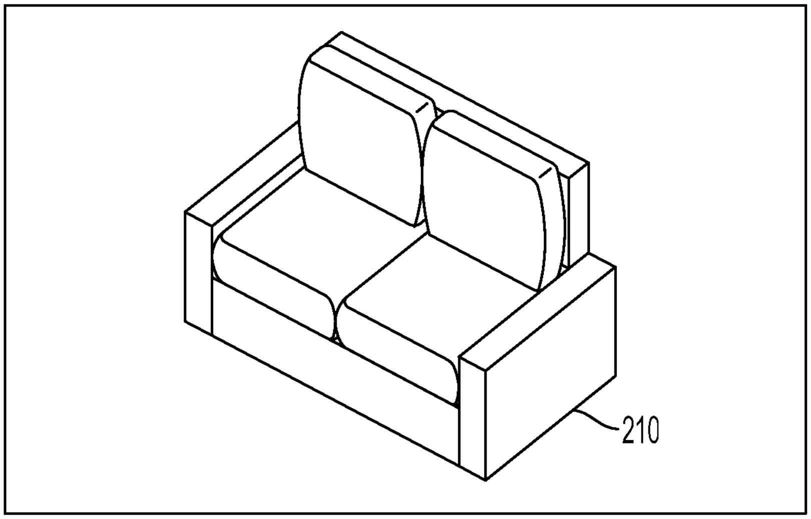
FIG. 5F illustrates an object template for virtual-world seat in accordance with one embodiment of the present invention.

In one embodiment, selecting the seating icon 534 results in camera icon 536 and hand icon 538 being displayed. Selecting camera icon 536 enables the capture system to assist the user to generate virtual-world objects. Selecting the hand icon 538 can allow a user to manually model virtual-world objects without the assistance of the capture system. After selecting either the camera icon 536 or the hand icon 538, the user may have the option to browse through various object templates in an effort to simplify generation of the virtual-world object. Exemplary object templates for different types of seating can include task chairs, loveseats, sofas, sectional sofas, chaise lounges, folding chairs, stools, and benches. FIG. 5F illustrates an object template for virtual-world seat 210' in accordance with one embodiment of the present invention.

Figures 2, 6A:
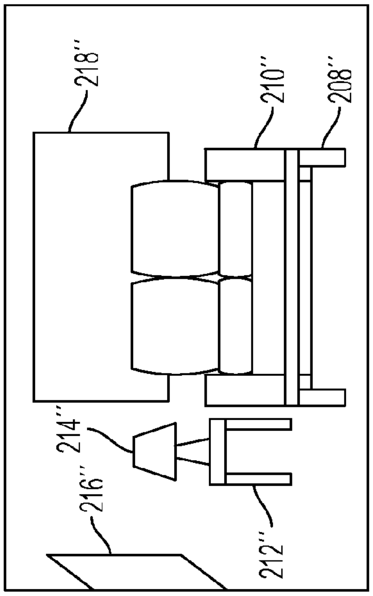
Figures 1, 6A:
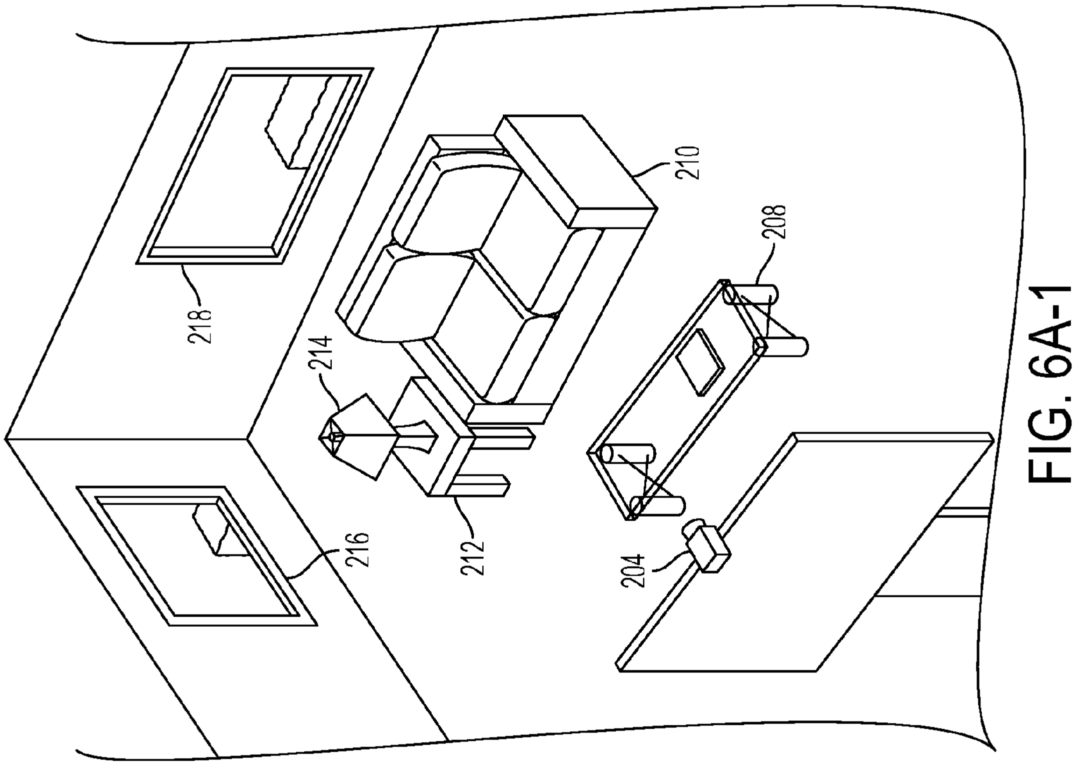

FIG. 6A-1 illustrates a real-world scene including the camera 204 while FIG. 6A-2 represents an on screen image of the real-world scene from FIG. 6A-1 taken by the camera 204. The real-world scene has real-world coffee-table 208, real-world seat 210, real-world end table 212, real-world lamp 214, real-world window 216 and real-world window 218. Accordingly, the screen image of FIG. 6A-2 includes the corresponding undefined virtual-world objects: virtual-world coffee table 208', virtual-world seat 210', virtual-world end table 212', virtual-world lamp 214', virtual-world window 216' and virtual-world window 218'.

Figures 2, 6B:
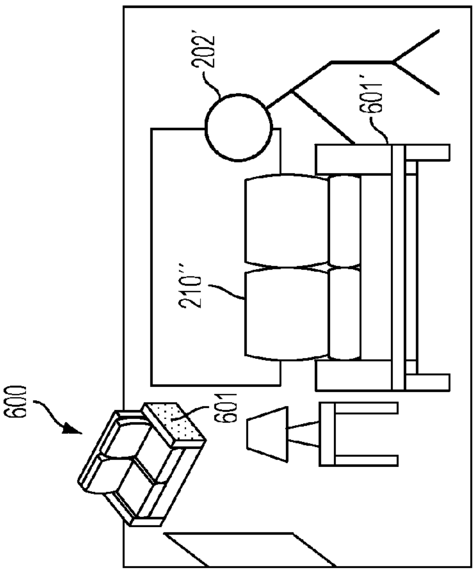
Figures 1, 6B:
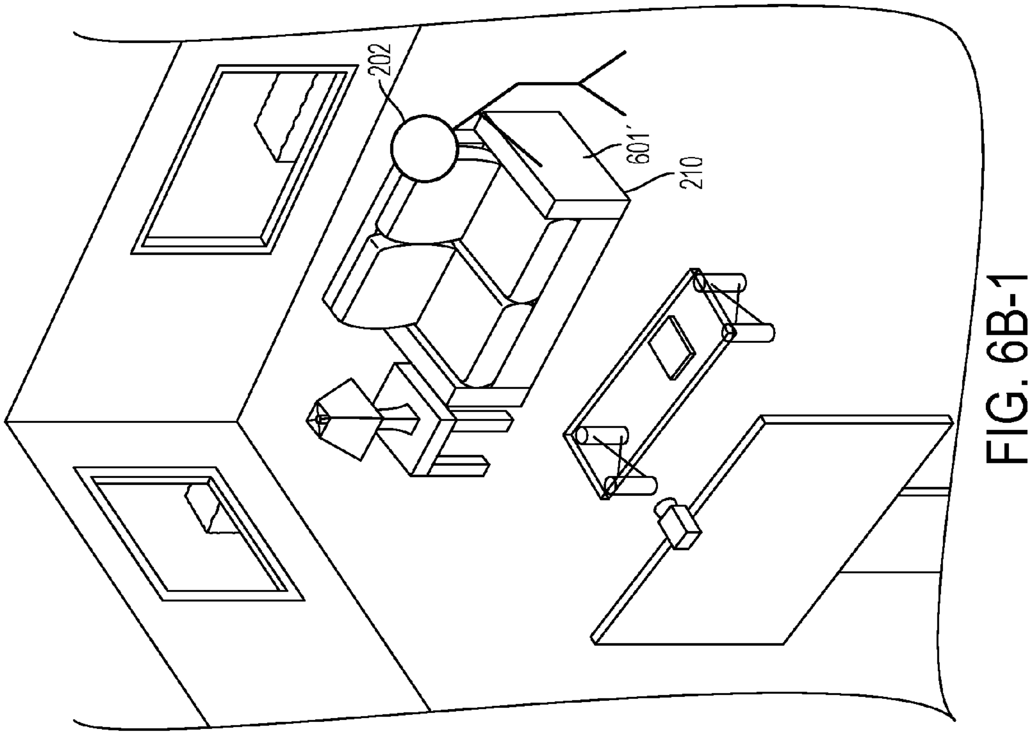
Figures 2, 6C:
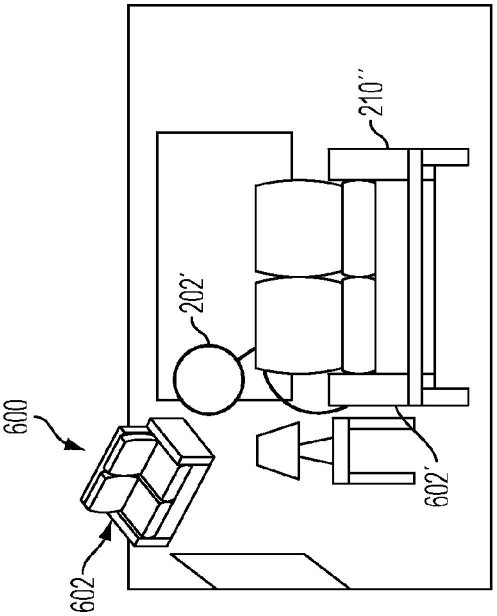
Figures 1, 6C:
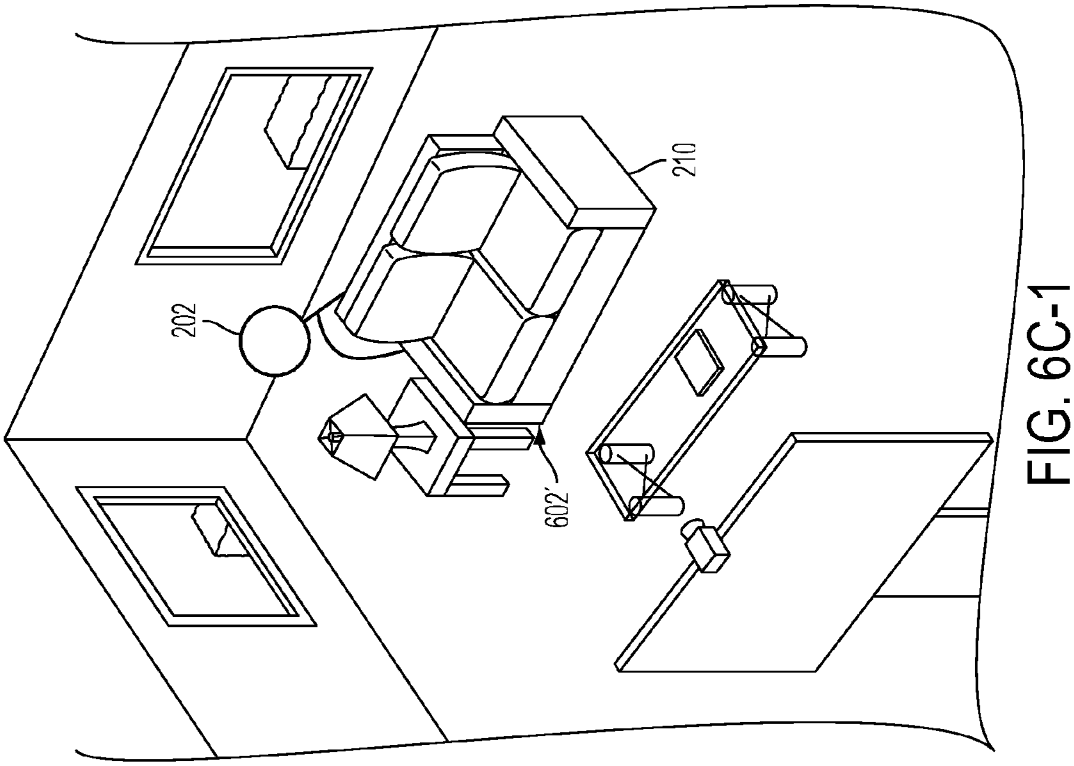
Figures 2, 6D:
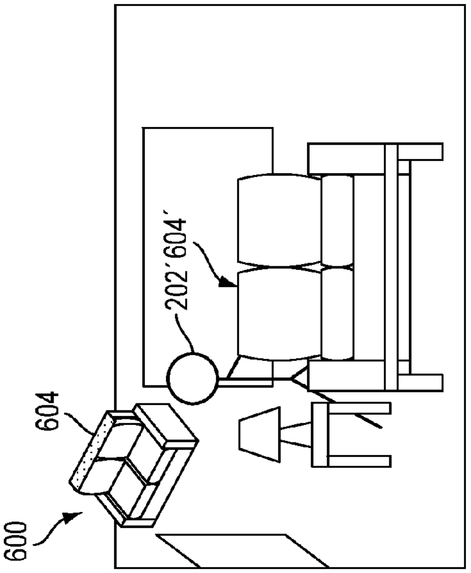
Figures 1, 6D:
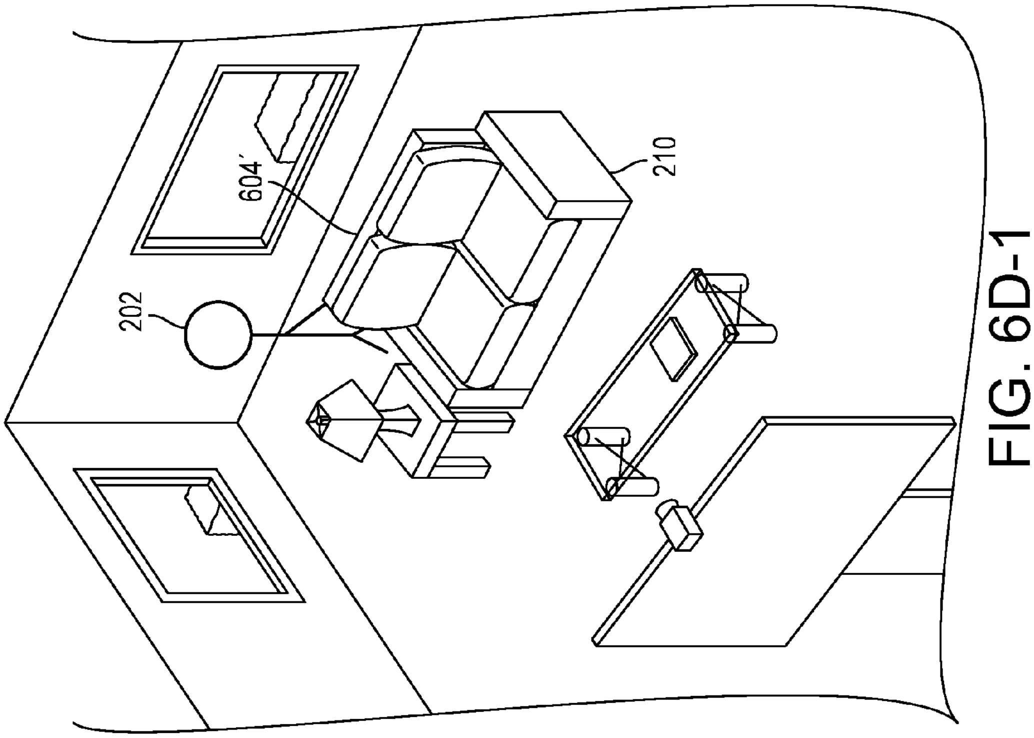
Figures 2, 6E:
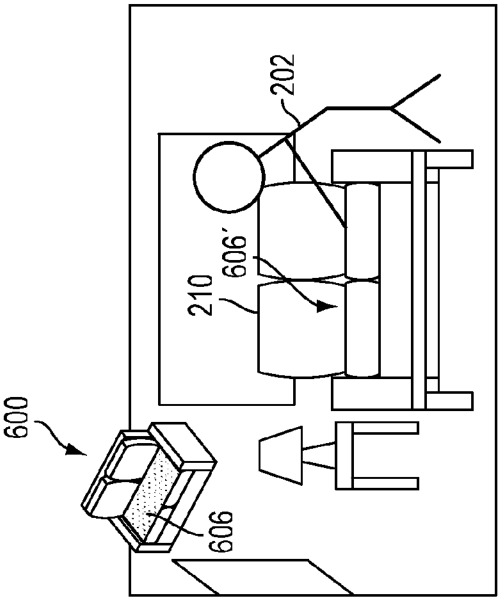
Figures 1, 6E:
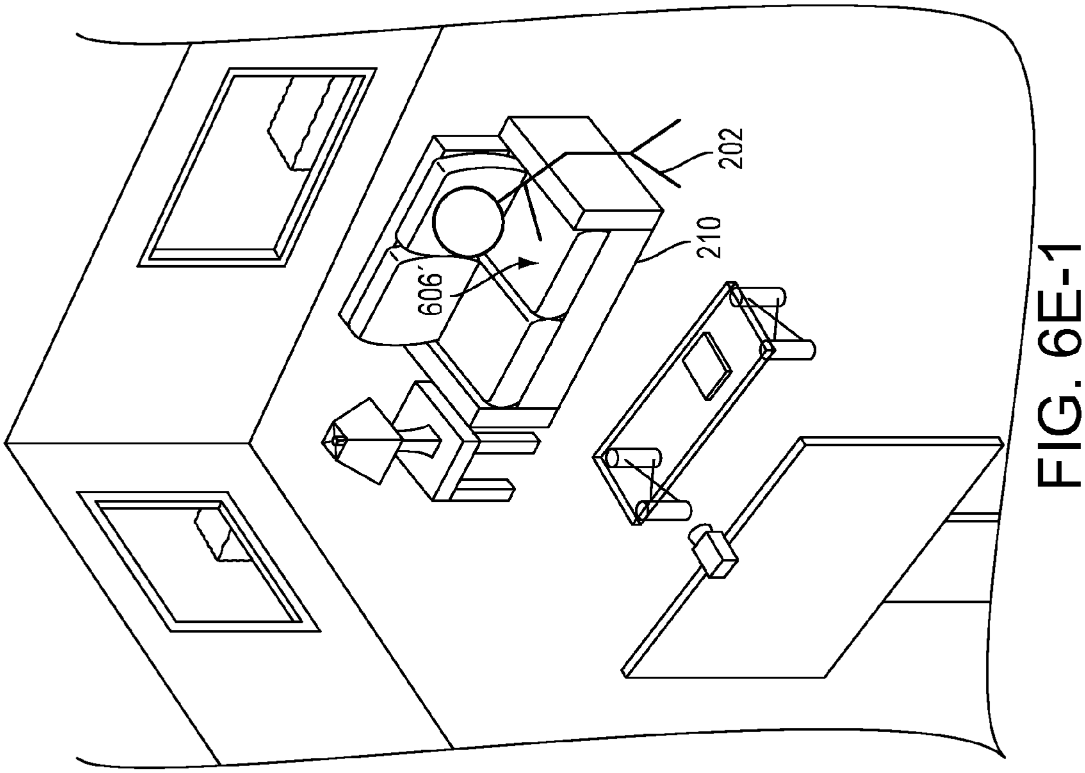
Figures 2, 6F:
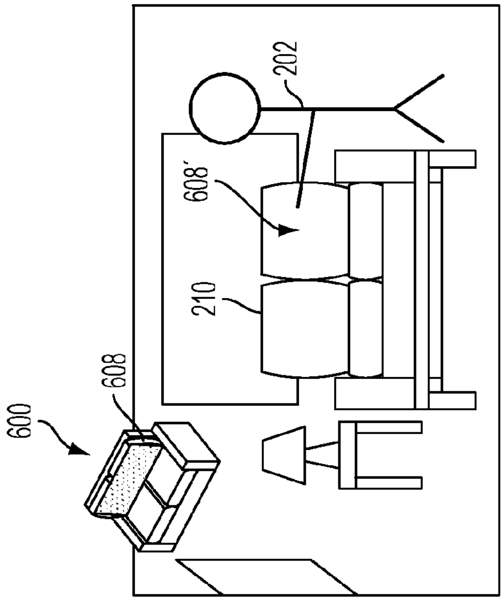
Figures 1, 6F:
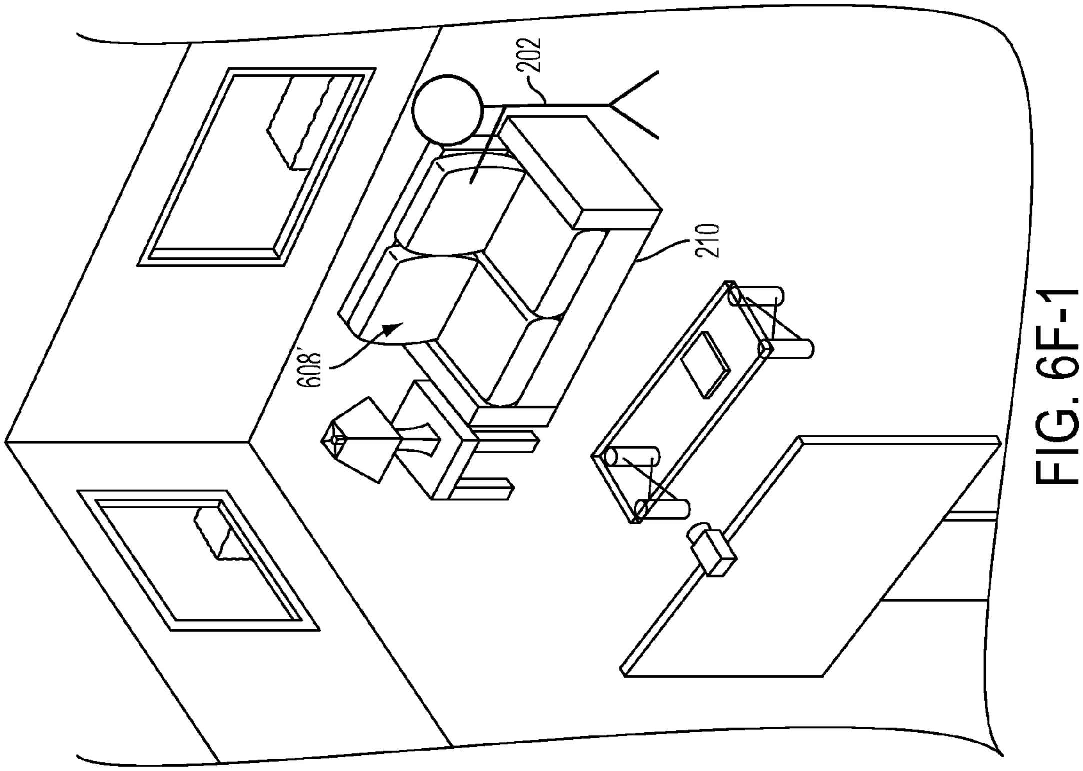
Figures 2, 6G:
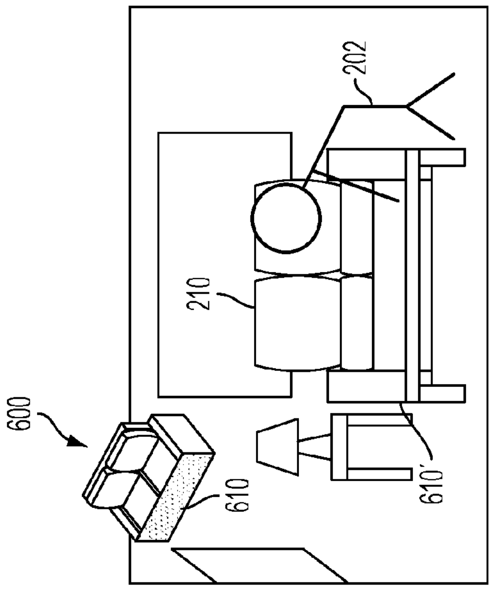
Figures 1, 6G:
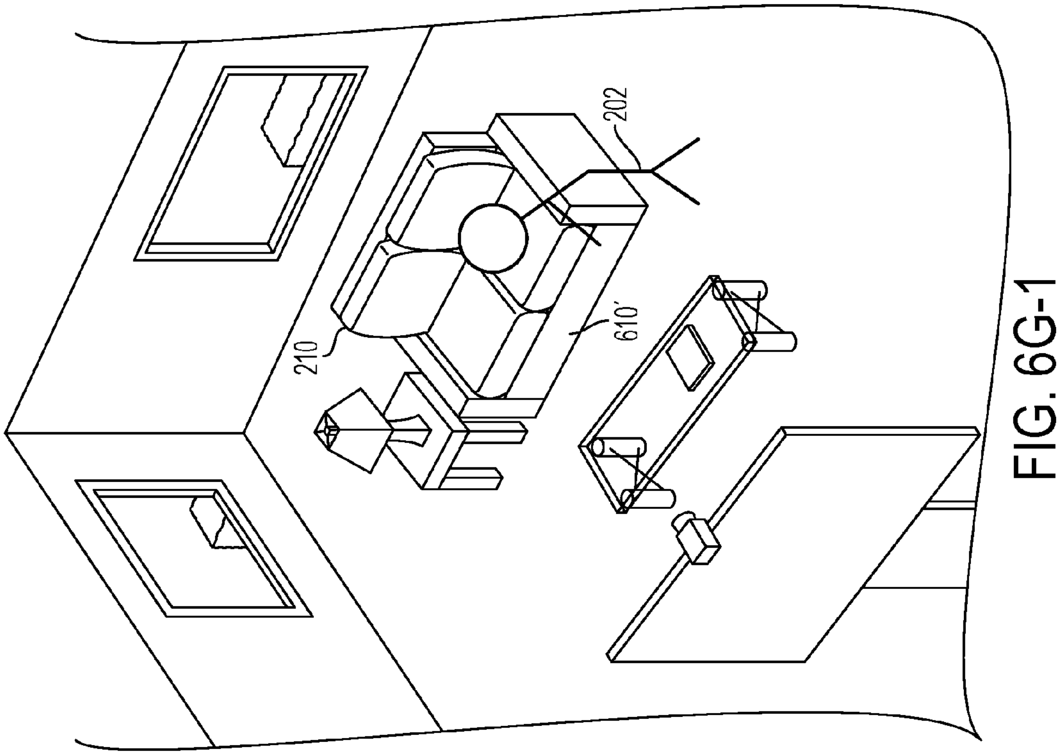

FIG. 6B-1 through FIG. 6G-1 shows the real-world scene that includes the user 202 interactively identifying various geometric attributes of the real-world seat 210 in response to on-screen prompts based on an object template, in accordance with one embodiment of the present invention. As previously discussed, a variety of object templates can be stored and recalled and a user can browse through the different templates to determine a best match for the particular real-world object that is to be defined in a virtual space. FIG. 6B-2 through FIG. 6G-2 show a screen displaying an image of the user identifying various surfaces, points or transitional surfaces of the real-world seat 210 in order to define and generate a virtual-world seat, in accordance with embodiments of the present invention. In FIG. 6B-2, the user 202 is prompted by an object template 600 to identify the highlighted surface 601 of the real-world seat 210. Accordingly, in both FIG. 6B-1 and FIG. 6B-2, the user 202 is show touching surface 601'. In FIG. 6C-2, the object template 600 prompts the user 202 to identify surface 602 of the real-world seat 210. Thus, in FIGS. 6C-1 and 6C-2 the user 202 identifies surface 602'.

As shown in FIG. 6D-2, the object template 600 prompts the user to identify surface 604. In accordance with various embodiments, in FIG. 6D-1 the user 202 can identify the surface 604' on the real-world seat 210 by either identifying the surface or by indicating various transitional surfaces such as points or edges. In one embodiment, to identify the surface 604', the user 202 could press a particular button on a controller while the controller is placed against the surface 604' and run down a length of the surface 604'. Upon reaching the end of the length of the surface 604', the user 202 would release the particular button. In another embodiment, the user 202 could identify a variety of reference points using the microphones of the capture system by snapping their fingers or clapping their hands at the front-right, front-left, rear-right and rear-left corners of the surface 604'.

The object template 600 prompts the user to identify a surface on the real-world seat 210 that corresponds with the highlighted surface 606 in FIG. 6E-2. Thus, in FIG. 6E-1 and FIG. 6E-2 the user 202 is shown at least partially identifying a surface 606' on the real-world seat 210. Similarly, in FIG. 6F-2 the object template 600 prompts the user to identify a surface on the real-world seat 210 that corresponds to the highlighted surface 608. Again, in both FIG. 6F-1 and FIG. 6F-2, the user 202 is shown identifying part of a surface 608'. In FIG. 6G-1 and FIG. 6G-2 the object template 600 prompts the user to identify a surface of the real-world seat 210 that corresponds to the highlighted surface 610. Thus, in FIG. 6G-1 and FIG. 6G-2 the user 202 is shown at least partially identifying a surface 610' on the real-world seat 210. Recall that a user can identify surfaces by defining a plurality of individual points and/or transition surfaces using a variety of input methods. For example, in some embodiments particular hand gestures can be used to indicate the relative position of an individual point. In other embodiments, a user can tap the surface to define the relative position of an individual point. In yet other embodiments, transitional surface can be defined when a user can runs their hand across the surface.

Figure 7A:
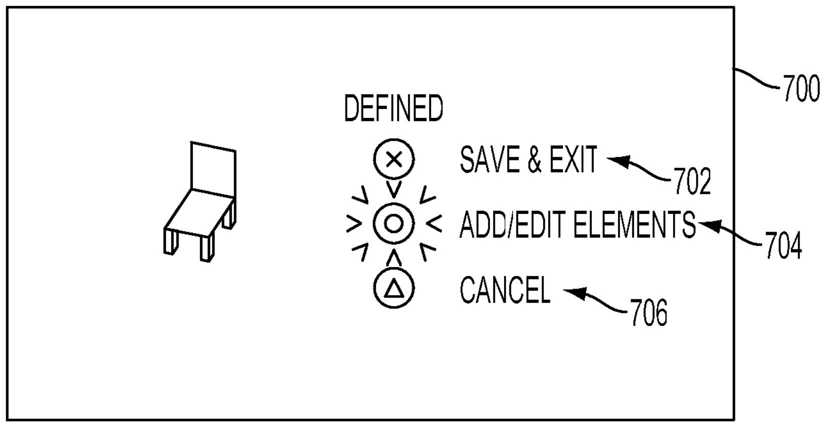
FIG. 7A is an exemplary graphical user interface illustrating choices for a user to select from after mapping the geometric attributes of a real-world object, in accordance with one embodiment of the present invention.

FIG. 7A is an exemplary graphical user interface illustrating choices for a user to select from after mapping the geometric attributes of a real-world object, in accordance with one embodiment of the present invention. Screen 700 indicates that a seat has been defined and provides the user the option to save and exit 702, add/edit elements 704, or cancel 706. In this example, the user selects add/edit elements 704 and the screen in FIG. 7B is displayed.

Figure 7B:
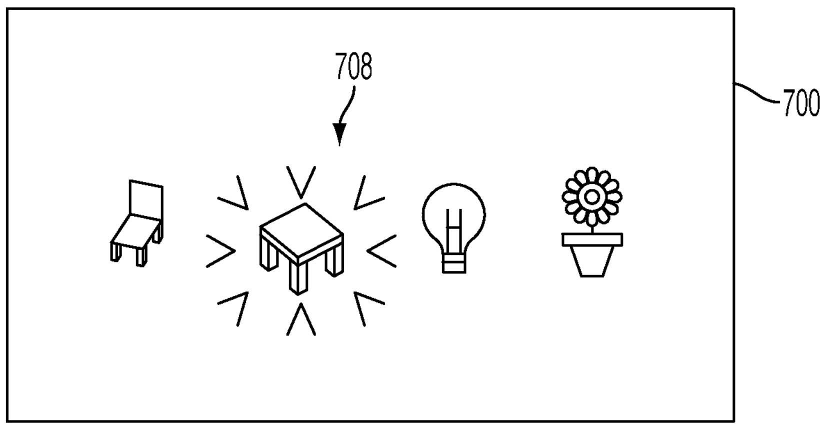
FIG. 7B shows a variety of household objects such as furniture and other fixed background objects that can be configured and customized for placement in a virtual-world media room or virtual-world living room, in accordance with one embodiment of the present invention.

FIG. 7B shows a variety of household objects such as furniture and other fixed background objects that can be configured and customized for placement in a virtual-world media room or virtual-world living room, in accordance with one embodiment of the present invention. From the screen shown in FIG. 7B, the user can select one of the household objects and return to the screen shown in FIG. 5E. As illustrated in FIG. 7B, a user selects to add a table 708. As previously discussed, after choosing to add the table 708 the user can elect to use the capture system to help map the table and then browse through various object templates for tables to find a suitable match to the user's real-world table.

Figures 2, 8A:
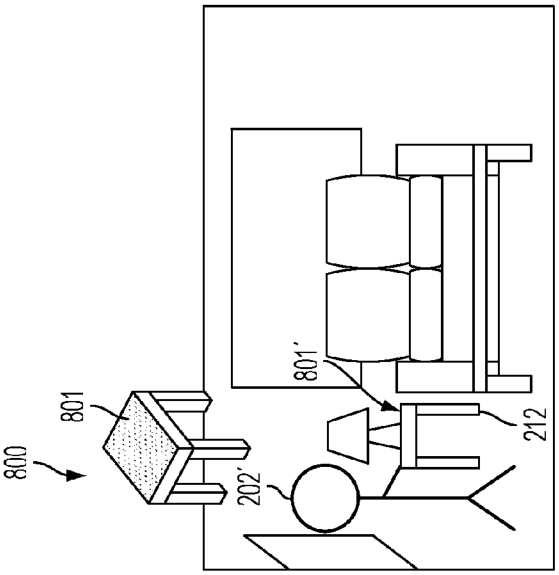
Figures 1, 8A:
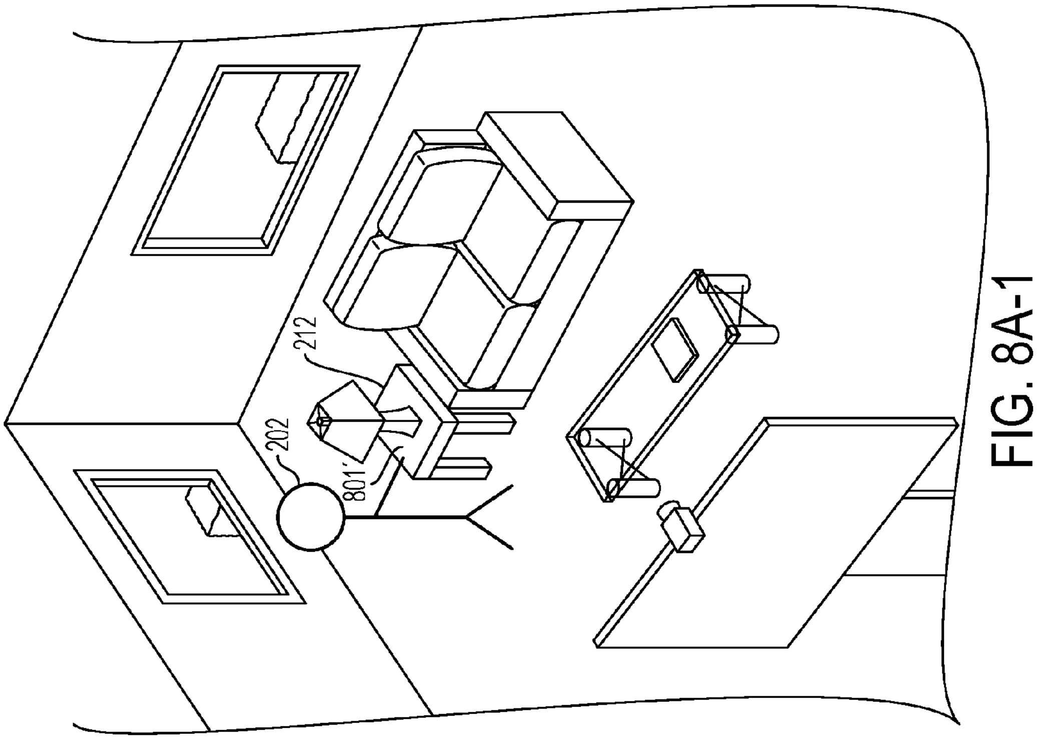
Figures 2, 8B:
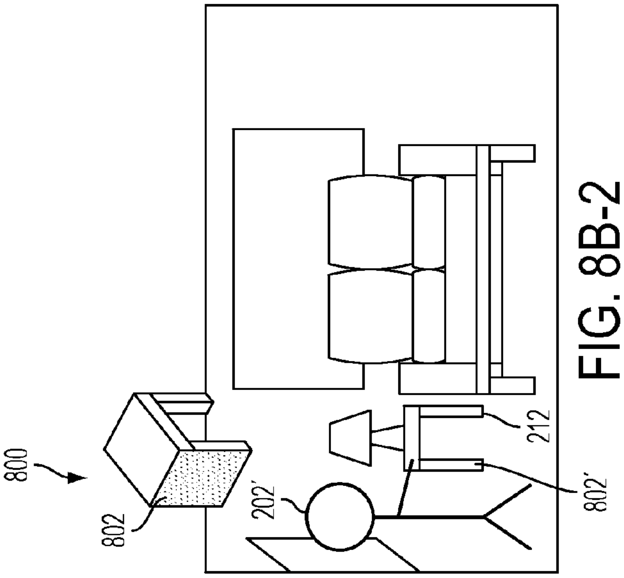
Figures 1, 8B:
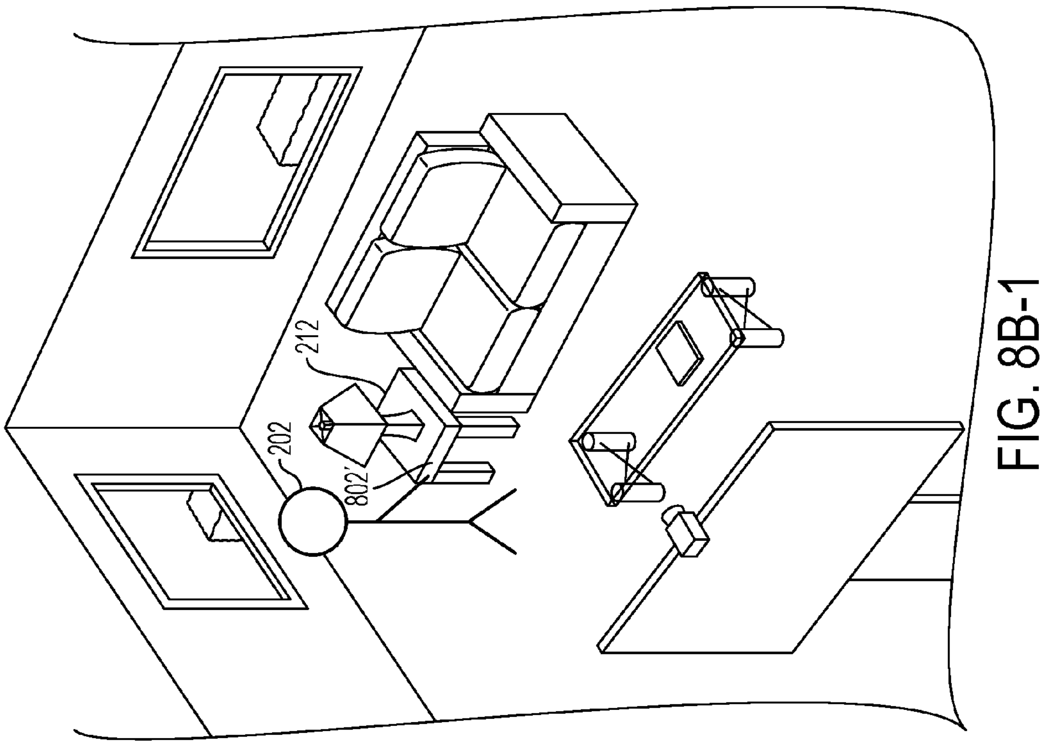
Figures 2, 8C:
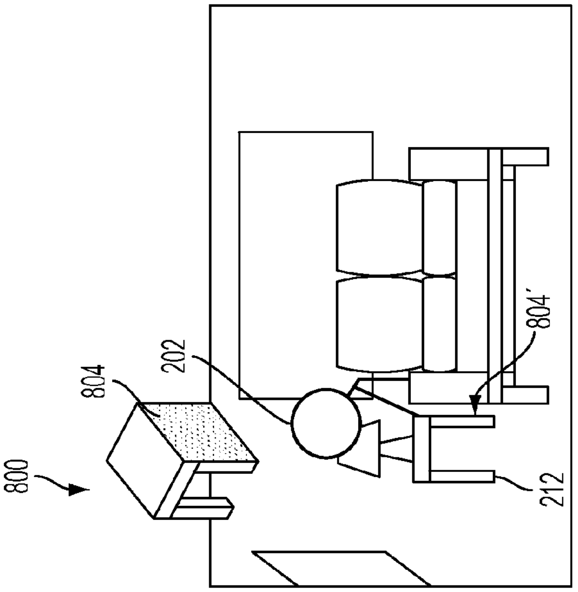
Figures 1, 8C:
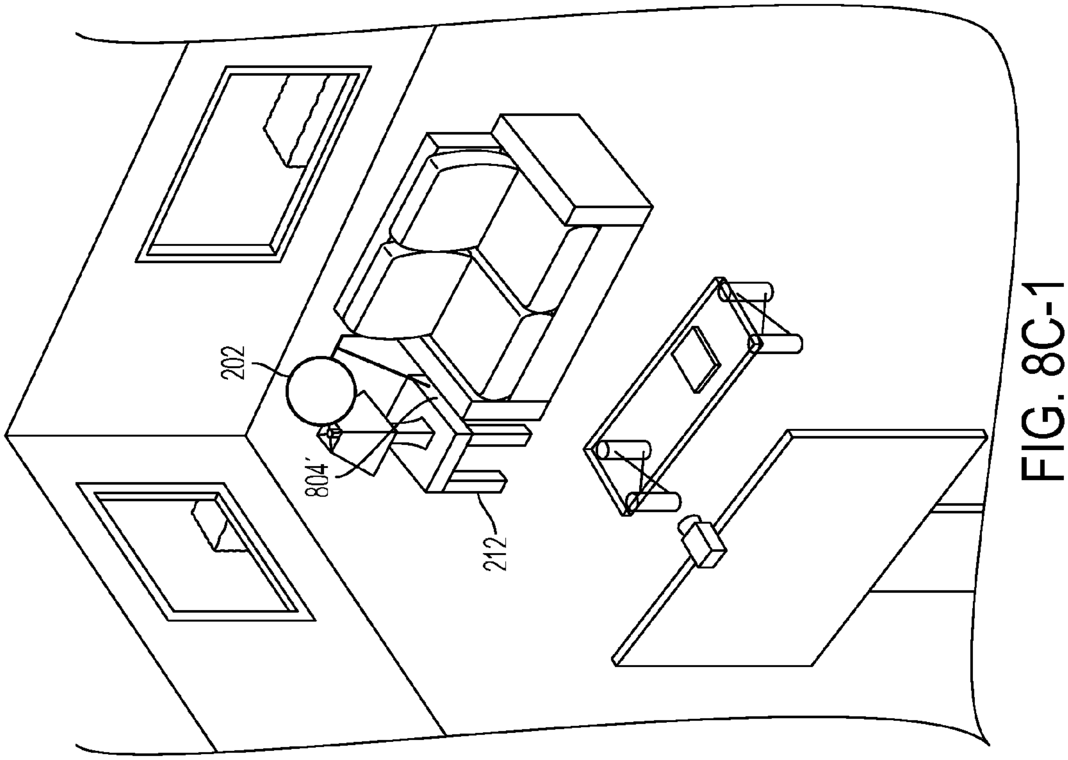
Figures 2, 8D:
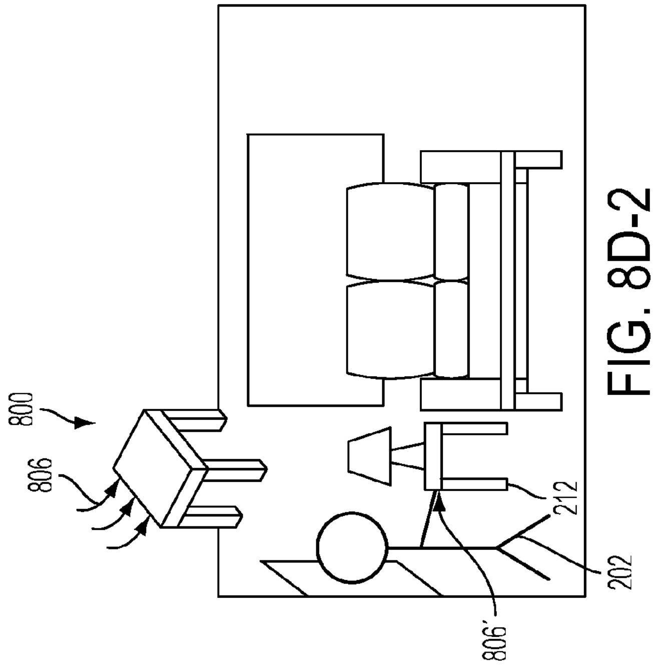
Figures 1, 8D:
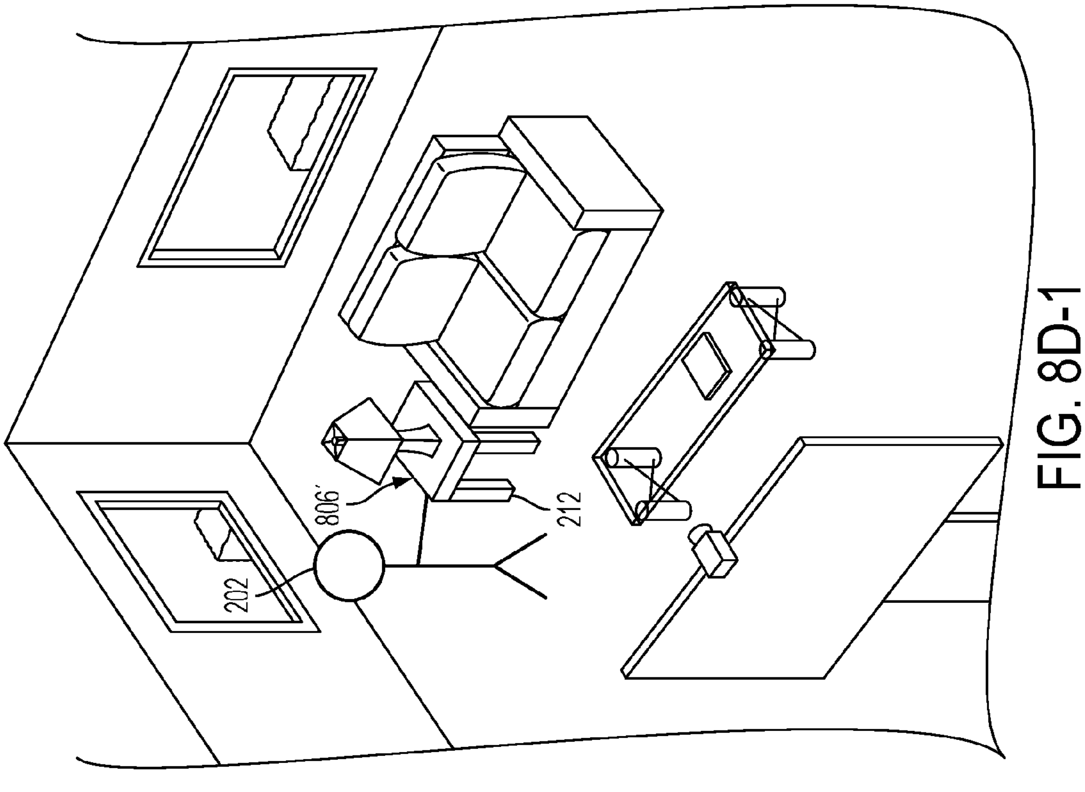

FIG. 8A-1 illustrates a real-world scene where a user identifies a real-world surface 801' on the real-world table 212, while FIG. 8A-2 illustrates an on-screen display that is prompting a user to identify a real-world surface that corresponds to surface 801 on the object template 800, in accordance with one embodiment of the present invention. Likewise, FIGS. 8B-1 and 8B-2 show the user 202 identifying real-world surface 802' in response to the prompt to identify a corresponding real-world surface to surface 802 of the object template 800, in accordance with one embodiment of the present invention. FIG. 8C-2 shows a user being prompted to identify a real-world surface that corresponds to surface 804 of the object template 800. Accordingly, in FIG. 8C-1, the user can identify the surface 804' with any of the previously discussed techniques. FIG. 8D-1 shows the user 202 identifying a surface 806'. In FIG. 8D-2, the object template 800 prompted the user 202 to identify a real-world surface that corresponds to the virtual-world surface 806. Also shown in FIG. 8D-2 is the image captured of the user 202 identifying the surface 806' from the perspective of a camera observing the scene in FIG. 8D-1.

Figures 2, 9A:
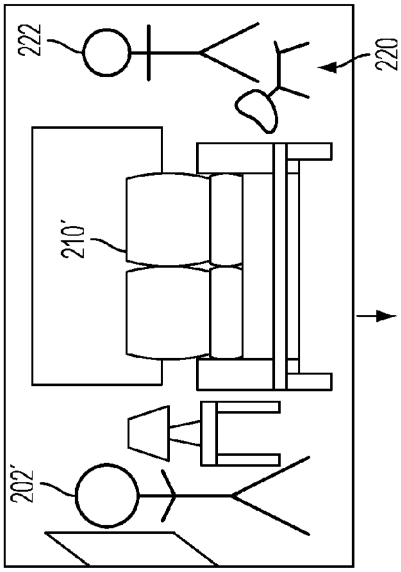

FIG. 9A-1 is a real-world scene of a user 202 sitting on the real-world seat 210 interactively manipulating an avatar representing user A 202 in a virtual-world, the virtual-world displayed to user A 202 on the screen 206, in accordance with one embodiment of the present invention. FIG. 9A-2 illustrates the virtual-world displayed to user A 202 on the screen 206 in FIG. 9A-1. Also shown in the FIG. 9A-2 is an avatar for virtual-world user B 222 along with virtual-world dog 220. For purposes of this discussion, the virtual-world seat 210' has been appropriately defined by user A 202 using the previously discussed techniques.

Figures 3, 9A:
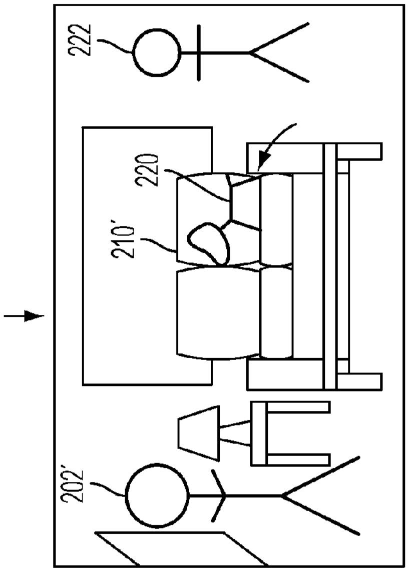
Figures 1, 9A:
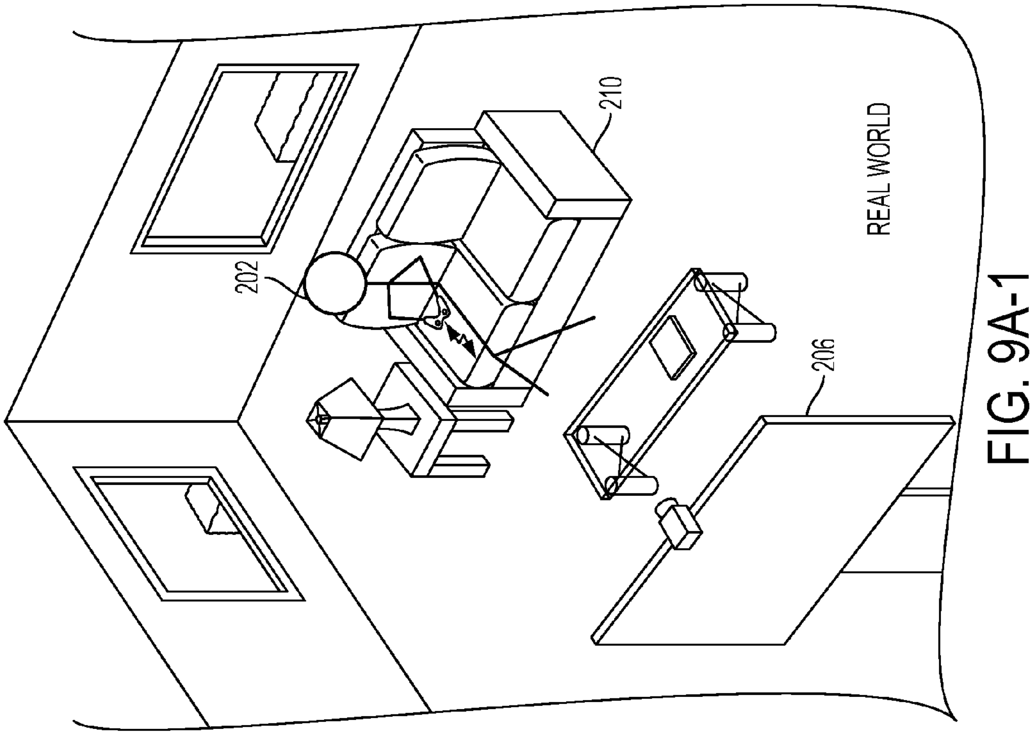

Thus, in this embodiment it would be possible for the virtual-world dog 220 to interact with the virtual-world seat 210'. For example, as illustrated in FIG. 9A-3, the virtual-world dog 220 is shown standing on the virtual-world seat 210'. Since the virtual-world seat 210' has had the surface 606 from FIGS. 6E-1 and 6E-2 defined, the virtual-world dog 220 can be shown as standing on the virtual-world seat 210'. Similarly, if the virtual-world seat 210' has the surface 608 from FIGS. 6F-1 and 6F-2 defined, the virtual-world dog 220 can be shown resting or leaning against the back of the virtual-world seat 210'.

Figures 2, 10A:
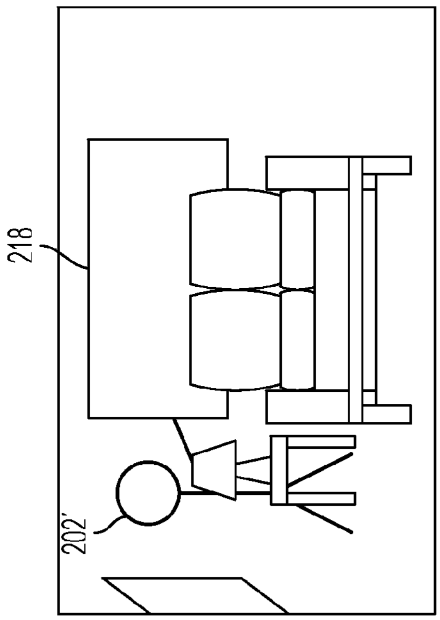
Figures 1, 10A:
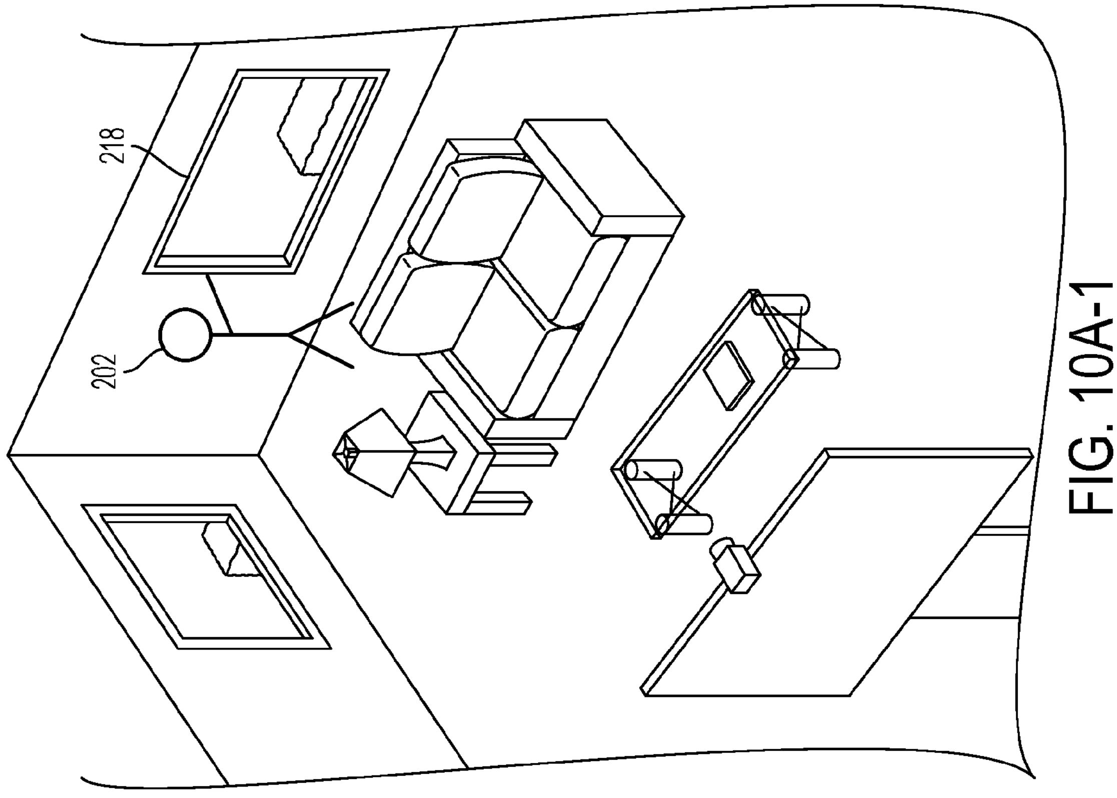

FIGS. 10A-1 and 10A-2 illustrate both the real-world scene and the virtual-world scene as displayed on the screen of user A 202 while mapping geometric attributes of the real-world window 218 in accordance with one embodiment of the present invention. In various embodiments, the virtual-world elements defined by the user can reflect real-world characteristics. In the case of the virtual-world window, different environments and photographs can be displayed in the virtual-world windows so the virtual-world home of user A 202 can appear to be in any real-world or fantasy location. For example, lunar landscapes or various cityscapes can be displayed in the virtual-world windows. Additionally, intensity of light coming through the virtual-windows can be synchronized with real-world time so virtual-world time mirrors the real-world time of the user.

Figures 2, 11A:
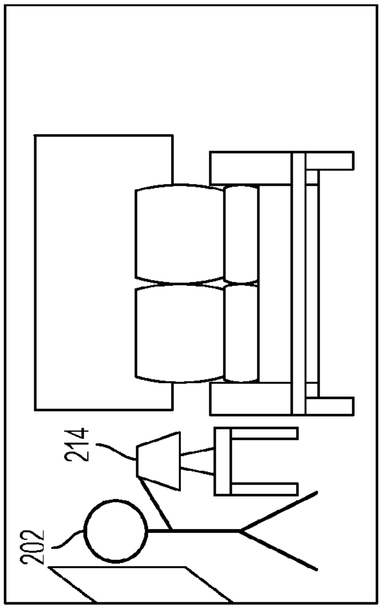
Figures 1, 11A:
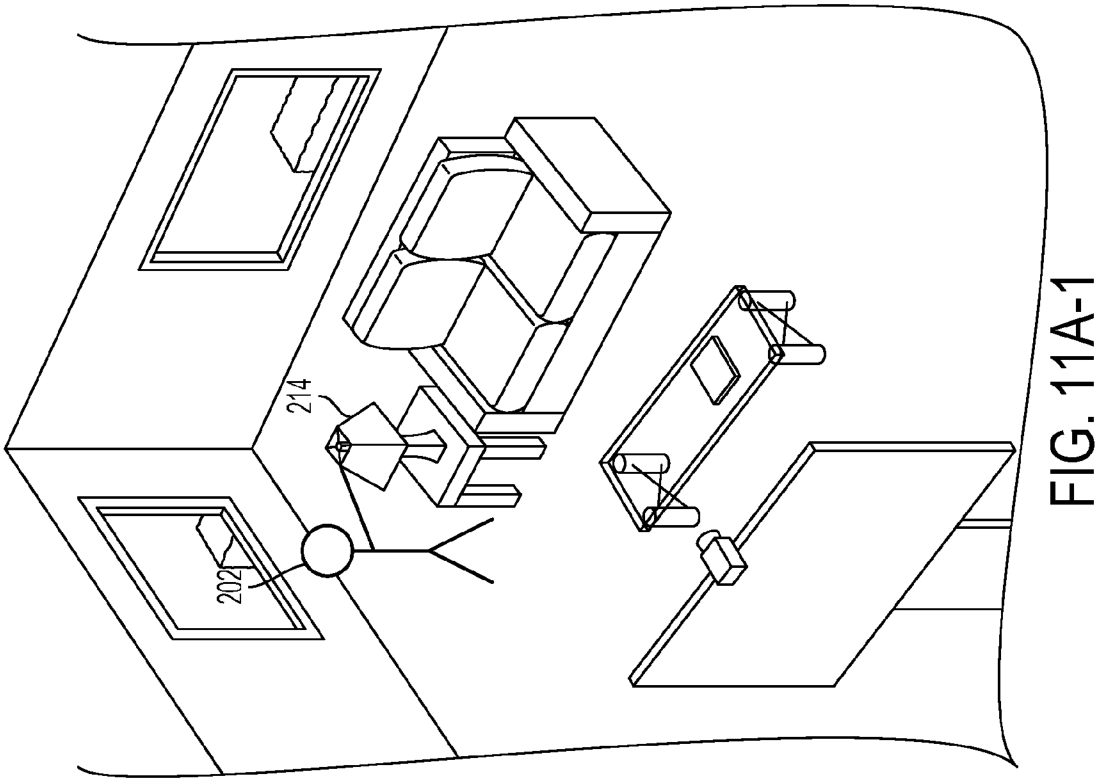

FIGS. 11A-1 and 11A-2 are additional illustrations of both the real-world scene and the virtual-world scene as displayed on the screen of user A 202 while mapping geometric attributes of the real-world lamp 214, in accordance with one embodiment of the present invention.

Figure 12:
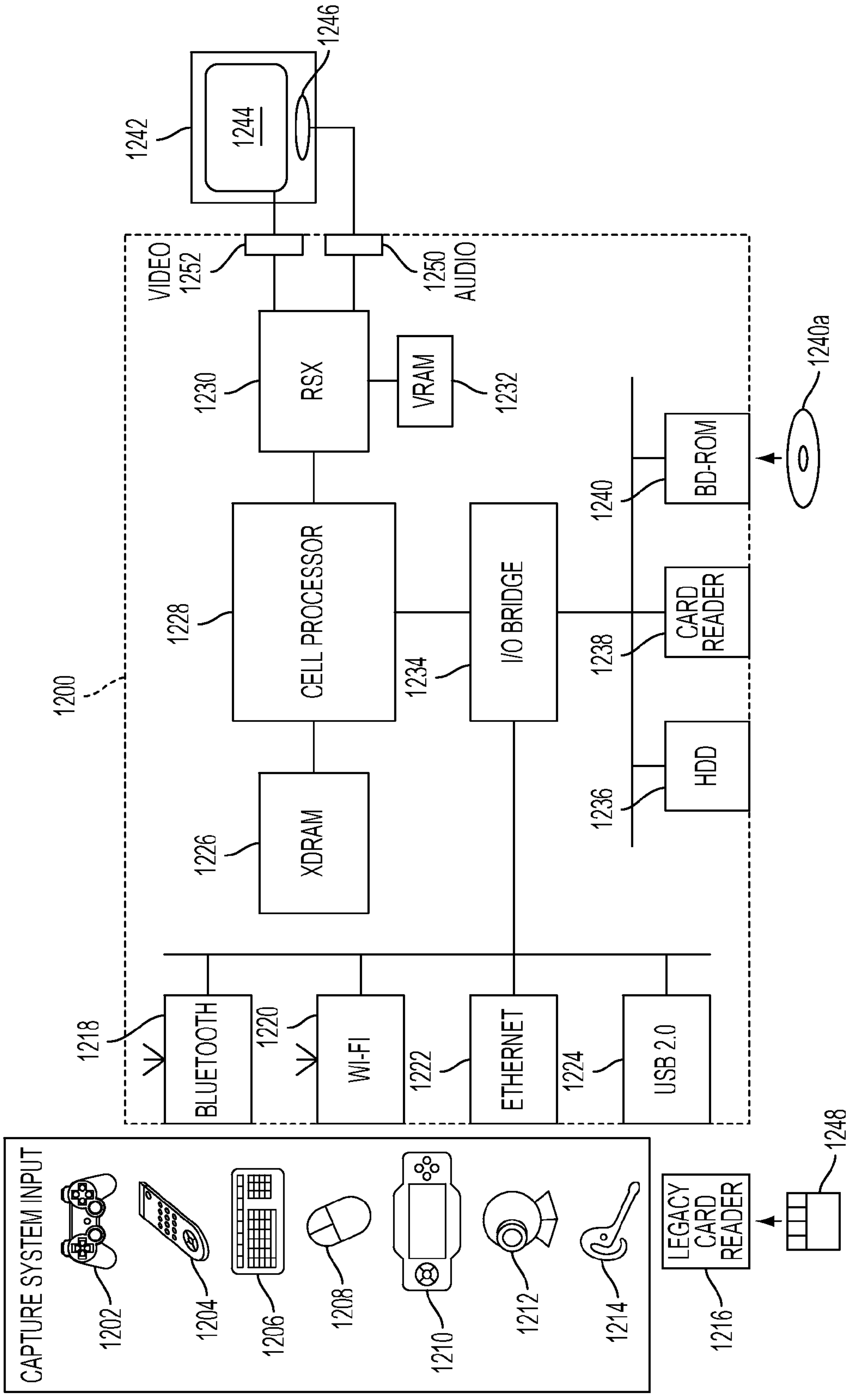
FIG. 12 schematically illustrates the overall system architecture of the Sony® Playstation 3® entertainment device, a console having controllers for implementing an avatar control system in accordance with one embodiment of the present invention.

FIG. 12 schematically illustrates the overall system architecture of the Sony® Playstation 3® entertainment device, a console having controllers for implementing an avatar control system in accordance with one embodiment of the present invention. A system unit 1200 is provided, with various peripheral devices connectable to the system unit 1200. The system unit 1200 comprises: a Cell processor 1228; a Rambus® dynamic random access memory (XDRAM) unit 1226; a Reality Synthesizer graphics unit 1230 with a dedicated video random access memory (VRAM) unit 1232; and an I/O bridge 1234. The system unit 1200 also comprises a Blu Ray® Disk BD-ROM® optical disk reader 1240 for reading from a disk 1240*a* and a removable slot-in hard disk drive (HDD) 1236, accessible through the I/O bridge 1234. Optionally the system unit 1200 also comprises a memory card reader 1238 for reading compact flash memory cards, Memory Stick® memory cards and the like, which is similarly accessible through the I/O bridge 1234.

The I/O bridge 1234 also connects to six Universal Serial Bus (USB) 2.0 ports 1224; a gigabit Ethernet port 1222; an IEEE 802.11b/g wireless network (Wi-Fi) port 1220; and a Bluetooth® wireless link port 1218 capable of supporting of up to seven Bluetooth connections.

In operation the I/O bridge 1234 handles all wireless, USB and Ethernet data, including data from one or more game controllers 1202. For example when a user is playing a game, the I/O bridge 1234 receives data from the game controller 1202 via a Bluetooth link and directs it to the Cell processor 1228, which updates the current state of the game accordingly.

The wireless, USB and Ethernet ports also provide connectivity for other peripheral devices in addition to game controllers 1202, such as: a remote control 1204; a keyboard 1206; a mouse 1208; a portable entertainment device 1210 such as a Sony Playstation Portable® entertainment device; a video camera such as an EyeToy® video camera 1212; and a microphone headset 1214. Such peripheral devices may therefore in principle be connected to the system unit 1200 wirelessly; for example the portable entertainment device 1210 may communicate via a Wi-Fi ad-hoc connection, whilst the microphone headset 1214 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1216 may be connected to the system unit via a USB port 1224, enabling the reading of memory cards 1248 of the kind used by the Playstation® or Playstation 2® devices.

In the present embodiment, the game controller 1202 is operable to communicate wirelessly with the system unit 1200 via the Bluetooth link. However, the game controller 1202 can instead be connected to a USB port, thereby also providing power by which to charge the battery of the game controller 1202. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1204 is also operable to communicate wirelessly with the system unit 1200 via a Bluetooth link. The remote control 1204 comprises controls suitable for the operation of the Blu Ray Disk BD-ROM reader 1240 and for the navigation of disk content.

The Blu Ray Disk BD-ROM reader 1240 is operable to read CD-ROMs compatible with the Playstation and PlayStation 2 devices, in addition to conventional pre-recorded and recordable CDs, and so-called Super Audio CDs. The reader 1240 is also operable to read DVD-ROMs compatible with the Playstation 2 and PlayStation 3 devices, in addition to conventional pre-recorded and recordable DVDs. The reader 1240 is further operable to read BD-ROMs compatible with the Playstation 3 device, as well as conventional pre-recorded and recordable Blu-Ray Disks.

The system unit 1200 is operable to supply audio and video, either generated or decoded by the Playstation 3 device via the Reality Synthesizer graphics unit 1230, through audio and video connectors to a display and sound output device 1242 such as a monitor or television set having a display 1244 and one or more loudspeakers 1246. The audio connectors 1250 may include conventional analogue and digital outputs whilst the video connectors 1252 may variously include component video, S-video, composite video and one or more High Definition Multimedia Interface (HDMI) outputs. Consequently, video output may be in formats such as PAL or NTSC, or in 720 p, 1080i or 1080 p high definition.

Audio processing (generation, decoding and so on) is performed by the Cell processor 1228. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1212 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1200. The camera LED indicator is arranged to illuminate in response to appropriate control data from the system unit 1200, for example to signify adverse lighting conditions. Embodiments of the video camera 1212 may variously connect to the system unit 1200 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1200, an appropriate piece of software such as a device driver should be provided. Device driver technology is well-known and will not be described in detail here, except to say that the skilled man will be aware that a device driver or similar software interface may be required in the present embodiment described.

Embodiments may include capturing depth data to better identify the real-world user and to direct activity of an avatar or scene. The object can be something the person is holding or can also be the person's hand. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for interactively defining a virtual-world space based on real-world objects in a real-world space, comprising:

(a) receiving an input identifying one or more reference points in the real-world space to define the virtual-world space;

(b) receiving an input identifying one of the real-world objects to characterize into a virtual-world object, the real-world object being other than a user;

(c) prompting, via an on-screen display, the user to select one or more object part locations on the real-world object, the object part locations being identified relative to an identifiable reference plane in the real-world space, the identifiable reference plane defined based on the reference points;

(d) receiving an input identifying the object part locations selected by the user in response to said prompting;

(e) extracting one or more parameters of the real-world object from the input identifying the object part locations; and (f) generating a virtual-world object in the virtual-world space using the extracted parameters of the real-world object.

2. The method as recited in claim 1, further comprising:

repeating (c)-(e), so as to extract additional parameters of the real-world object to further define the virtual-world object.

3. The method as recited in claim 1, further comprising:

repeating (b)-(f), so as to generate a different virtual-world object in the virtual-world space from a second real-world object.

4. The method as recited in claim 3, further comprising repeating (c)-(e), so as to extract additional parameters of the second real-world object to further define the different virtual-world object.

5. The method as recited in claim 1, wherein the virtual-world object, upon being generated, is displayed on a display screen along with other virtual-world objects, and the other virtual-world objects are able to interact with the generated virtual-world object, the interaction detected when dimensional parameters of the other virtual objects at least partially intersect with the generated virtual-world object defined by the extracted parameters of the real-world object.

6. The method as recited in claim 5, wherein when intersection between the dimensional parameters of the other virtual-world objects and the generated virtual-world object is detected, performing one of:

(a) occluding the other virtual-world objects by the generated virtual-world object;

(b) occluding the generated virtual-world object by the other virtual-world objects;

(c) obstructing motion or placement of the other virtual-world objects with the generated virtual-world object;

(d) deforming the other virtual-world objects so as to conform the other virtual-world objects to the generated virtual-world object; or (e) enabling interaction between the other virtual-world objects and the generated virtual-world object.

7. The method as recited in claim 1, wherein the reference points are digitally captured by obtaining one or more image frames of the real-world space.

8. The method as recited in claim 1, further comprising:

looking up an object template that substantially matches geometric attributes of the real-world object; and implementing the object template to render a representation of the real-world object as the virtual-world object.

9. The method as recited in claim 8, wherein the object template defines the object part locations used to prompt user identification.

10. The method as recited in claim 9, wherein the object part locations represent one or more of:

(a) substantially vertical surfaces on the real-world object;

(b) substantially horizontal surfaces of the real-world object; or (c) edge boundaries of the real-world object.

11. The method as recited in claim 1, wherein the parameters include one or more dimensions of the object part locations.

12. The method as recited in claim 1, wherein (c) includes prompting, via the on-screen display, the user to touch the object part locations, and wherein (d) includes receiving the input identifying the object part locations touched by the user.

13. A method for interactively defining a virtual-world space based on real-world objects in a real-world space, comprising:

(a) receiving an input identifying one or more reference points in the real-world space to define the virtual-world space;

(b) receiving an input identifying one of the real-world objects to characterize into a virtual-world object, the real-world object being other than a user;

(c) prompting, via an on-screen display, the user to select one or more transition boundaries of the real-world object, the transition boundaries being identified relative to an identifiable reference plane in the real-world space, the identifiable reference plane defined based on the reference points;

(d) receiving an input identifying the transition boundaries selected by the user in response to said prompting;

(e) determining geometric aspects of the real-world object from the input identifying the transition boundaries; and (f) generating the virtual-world object in the virtual-world space using the geometric aspects of the real-world object.

14. The method as recited in claim 13, wherein the transition boundaries include vertices, edges, filleted vertices, or filleted edges.

15. The method as recited in claim 13, further comprising: repeating (c)-(e), so as to determine additional geometric aspects of the real-world object to further define the virtual-world object.

16. The method as recited in claim 13, further comprising: repeating (b)-(f), so as to generate a different virtual-world object in the virtual-world space from a second real-world object.

17. The method as recited in claim 13, wherein the virtual-world object, upon being generated, is displayed on a display screen along with other virtual-world objects, and the other virtual-world objects are able to interact with the generated virtual-world object, the interaction detected when dimensional parameters of the other virtual objects at least partially intersect with the generated virtual-world object defined by the geometric aspects of the real-world object.

18. The method as recited in claim 17, wherein when intersection between the dimensional parameters of the other virtual-world objects and the generated virtual-world object is detected, performing one of:

(a) occluding the other virtual-world objects by the generated virtual-world object;

(b) occluding the generated virtual-world object by the other virtual-world objects;

(c) obstructing motion or placement of the other virtual-world objects with the generated virtual-world object;

(d) deforming the other virtual-world object so as to conform the other virtual-world objects to the generated virtual-world object; and (e) enabling interaction between the other virtual-world objects and the generated virtual-world object.

19. The method of claim 13, wherein the transition boundaries include corners of the real-world object.

20. The method of claim 13, wherein (c) includes prompting, via the on-screen display, the user to touch the transition boundaries of the real-world object, and wherein (d) includes receiving the input identifying the transition boundaries touched by the user in response to said prompting.

21. A method for interactively defining a virtual-world space based on real-world objects in a real-world space, comprising:

(a) receiving an input identifying one or more reference points in the real-world space to define the virtual-world space;

(b) receiving an input identifying one of the real-world objects to characterize into a virtual-world object, the real-world object being other than a user;

(c) prompting, via an on-screen display, the user to select one or more surface locations on the real-world object, the surface locations being identified relative to an identifiable reference plane in the real-world space, the identifiable reference plane defined based on the reference points;

(d) receiving an input identifying the surface locations selected by the user in response to said prompting;

(e) extracting one or more geometric aspects of the real-world object from the input identifying the surface locations; and (f) generating the virtual-world object in the virtual-world space using the geometric aspects of the real-world object.

22. The method as recited in claim 21, further comprising:

repeating (c)-(e), so as to extract additional geometric aspects of the real-world object to further define the virtual-world object.

23. The method as recited in claim 21, wherein the virtual-world object, upon being generated, is displayed on a display screen along with other virtual-world objects, and the other virtual-world objects are able to interact with the generated virtual-world object, the interaction detected when dimensional parameters of the other virtual objects at least partially intersect with the generated virtual-world object defined by the geometric aspects of the real-world object.

24. The method as recited in claim 23, wherein when intersection between the dimensional parameters of the other virtual-world objects and the generated virtual-world object is detected, performing one of:

(a) occluding the other virtual-world objects by the generated virtual-world object;

(b) occluding the generated virtual-world object by the other virtual-world objects;

(c) obstructing motion or placement of the other virtual-world objects with the generated virtual-world object;

(d) deforming the other virtual-world objects so as to conform the other virtual-world objects to the generated virtual-world object; and (e) enabling interaction between the other virtual-world objects and the generated virtual-world object.

25. The method of claim 21, wherein (c) includes prompting, via the on-screen display, the user to touch the surface locations on the real-world object, wherein (d) includes receiving the input identifying the surface locations touched by the user in response to said prompting.

26. A computer for creating virtual objects based on real-world objects, comprising:

a processor, a memory, and a display screen, the memory coupled to the processor, the display screen coupled to the processor;

wherein the processor is configured to:

receive an input identifying one or more reference points in a real-world space to define a virtual-world space;

receive an input identifying one of the real-world objects to characterize into a virtual-world object, the real-world object being other than a user;

wherein the display screen is configured to prompt the user to select one or more object part locations on the real-world object, the object part locations being identified relative to an identifiable reference plane in the real-world space;

wherein the processor is further configured to:

receive an input identifying the object part locations selected by the user in response to the prompt;

extract one or more parameters of the real-world object from the input identifying the object part locations;

wherein the processor is configured to generate the virtual-world object in the virtual-world space using the extracted parameters of the real-world object.

27. The computer system as recited in claim 26, wherein the processor is further configured to manipulate other virtual objects, the other virtual objects able to interact with the generated virtual-world object, the interaction of the other virtual-world objects restricted to conform to geometric aspects of the generated virtual-world object.

28. The computer system as recited in claim 26, wherein the memory is configured to store the generated virtual-world object.

29. The computer system as recited in claim 26, wherein the display screen is configured to prompt the user to touch the object part locations on the real-world object, wherein the processor is further configured to receive the input identifying the object part locations touched by the user in response to the prompt.

* * * * *